United States Patent
Shibayama et al.

[11] Patent Number: 6,124,984
[45] Date of Patent: Sep. 26, 2000

[54] VARIABLE MAGNIFICATION OPTICAL ZOOM LENS SYSTEM

[75] Inventors: Atsushi Shibayama; Koichi Ohshita, both of Tokyo, Japan

[73] Assignee: Nikon Corporation, Tokyo, Japan

[21] Appl. No.: 08/990,063

[22] Filed: Dec. 12, 1997

[30] Foreign Application Priority Data

Dec. 13, 1996 [JP] Japan .................................. 8-353024
Jun. 30, 1997 [JP] Japan .................................. 9-189039
Aug. 5, 1997 [JP] Japan .................................. 9-222071

[51] Int. Cl.[7] .............................. G02B 15/14; G02B 3/02
[52] U.S. Cl. ..................................... 359/689; 359/708
[58] Field of Search ................................ 359/680–682, 359/683, 687, 689, 676, 708, 713–716, 686

[56] References Cited

U.S. PATENT DOCUMENTS

| | | | |
|---|---|---|---|
| 4,647,160 | 3/1987 | Ikemori | 359/680 |
| 4,730,907 | 3/1988 | Kikuchi et al. | 359/681 |
| 4,810,072 | 3/1989 | Takahashi | 359/689 |
| 4,824,223 | 4/1989 | Doctor et al. | 359/689 |
| 4,838,666 | 6/1989 | Shiraishi | 359/689 |
| 4,999,007 | 3/1991 | Aoki et al. | 359/676 |
| 5,009,491 | 4/1991 | Hata | 359/689 |
| 5,262,897 | 11/1993 | Kawamura | 359/689 |
| 5,872,660 | 2/1999 | Kohno et al. | 359/689 |

FOREIGN PATENT DOCUMENTS

| | | |
|---|---|---|
| 58-143311 | 8/1983 | Japan . |
| 59-18917 | 1/1984 | Japan . |
| 60-181717 | 9/1985 | Japan . |
| 61-200523 | 9/1986 | Japan . |
| 61-286812 | 12/1986 | Japan . |
| 62-200316 | 9/1987 | Japan . |
| 63-17423 | 1/1988 | Japan . |
| 63-281113 | 11/1988 | Japan . |
| 1-189622 | 7/1989 | Japan . |
| 4-114116 | 4/1992 | Japan . |
| 6-94996 | 4/1994 | Japan . |
| 300968 | 10/1994 | Japan . |
| 13077 | 1/1995 | Japan . |
| 261083 | 10/1995 | Japan . |

*Primary Examiner*—Scott J. Sugarman
*Assistant Examiner*—Jordan M. Schwartz
*Attorney, Agent, or Firm*—Michael N. Meller; Eugene Lieberstein

[57] ABSTRACT

A variable magnification zoom lens system comprising: in order from the object side, a first lens group having a negative refractive power and a focal length f1; a second lens group having a positive refractive power; and a third lens group having a positive refractive power and a focal length f3 with the first and second lens group arranged to be driven together such that when zooming is performed from the maximum wide-angle state to the maximum telephoto state of the zoom lens system, the first lens group and the second lens group move such that the distance between the first lens group and the second lens group is decreased, and at the same time, the distance between second lens group and the third lens group is increased and with the following condition being fulfilled: $0.4 < f3/|f1| < 0.8$.

9 Claims, 36 Drawing Sheets

VARIABLE MAGNIFICATION OPTICAL ZOOM LENS SYSTEM

FIELD OF THE INVENTION

The present invention relates to a variable magnification zoom lens system and more specifically to a compact variable magnification zoom lens system for use in a lens shutter type camera or a digital still camera.

BACKGROUND OF THE INVENTION

In recent years, the zoom lens has become a popular feature of a lens shutter type camera and a digital still camera particularly a zoom lens with a high zoom ratio of over 3×. The zoom lens with a high zoom ratio of this type basically uses zoom lenses having more than three lens groups which are movable during zooming.

A large number of zoom lenses of conventional technology having a field angle of about 60° have been proposed. Unlike a single reflex camera in which a lens system is switchable, the lens system and camera body are formed integrally which contributes to a reduction in the size of the camera body. As a result, a variety of compact zoom lens inventions have been proposed.

In the digital still camera, a solid state image sensor such as a charge coupled device (CCD) is used for the lens system. A CCD is made up of photo sensors, which have a capability of photoelectric conversion. A potential difference corresponding to the light intensity is measured in each of the photo sensors. However, each of the detector devices is microscopic, therefore, the level of light intensity which arrives at each of the photo sensors is so small that it is susceptible to noise interference. Therefore, a micro lens array is arranged immediately before each of the photo sensors to increase the light beams which reach each of the photo sensors. Due to the presence of the micro lens array, if the exit pupil of the lens system is located near a CCD, the light beams which should reach peripheries of the image plane do not reach a photo sensor, thus causing a lack of light intensity. For this reason, there is a limitation in the lens system which uses a solid state image sensor such as a CCD that the distance between the exit pupil and the image plane be sufficiently apart as in the case, for example, for a digital still camera lens system.

FIG. 36 shows a refractive power layout of the image side telocentric optical system, its exit pupil is at the infinitely far range. In FIG. 36, lens system L comprises lens group L1, which is arranged more toward the object side over aperture stop S, and lens group L2, which is arranged more toward the image side over aperture stop S. A CCD is located at position I, which is the image plane of the lens system L. In FIG. 36, as principal ray R indicates, an image of aperture stop S (that is the exit pupil) made by lens group L2 is at the infinitely far range. Therefore, in order to reduce the distance between aperture stop S and the image plane I (where a CCD is), the convergence capability of lens group L2 needs to be increased and at the same time, the thickness of lens group L2 needs to be decreased in the optical axial direction. As such, the telocentric optical system in which the exit pupil is positioned completely at the infinitely far range is not suited to reducing the overall lens length.

SUMMARY OF THE INVENTION

Based on the above reasons, the first object of the present invention is to provide a compact zoom lens system in which the distance between the exit pupil and the image plane is sufficiently apart.

The second object of the present invention is to provide a compact zoom lens system having a zoom ratio of over 2.5×, a field angle of about 60° at the maximum wide-angle state, and an excellent imaging performance which is suited to a high pixel density solid state image sensor.

One embodiment of a variable magnification zoom lens system in accordance with the present invention comprises: in order from the object side, a first lens group having a negative refractive power;

a second lens group having a positive refractive power; and a third lens group having a positive refractive power;

with the first and second lens group being arranged such that when zooming from the maximum wide-angle state to the maximum telephoto state, the first lens group and the second lens group move relative to each other and to the third lens group to make the lens separation between the first lens group and the second lens group to be reduced while the lens separation between the second lens group and the third lens group is increased and so that the following condition is fulfilled:

$$0.4 < |f3/f1| < 0.8$$

where f1: is the focal length of the first lens group and f3: is the focal length of the third lens group.

Another embodiment of a variable magnification zoom lens system in accordance with the present invention comprises: in order from the object side, a first lens group having an overall negative refractive power which includes, from the object side, two negative lenses and a positive lens; and a second lens group having a positive refractive power; and a third lens group, which is fixed with respect to the optical axis and has a positive refractive power;

wherein, the first and second lens group are moved such that when zooming from the maximum wide-angle state to the maximum telephoto state, the distance between the first lens group and the second lens group is reduced, and at the same time, the distance between the second lens group and the third lens group is increased; and the following conditions are fulfilled:

$$0.7 < f2/|f1| < 1.5$$

$$3 < f3/fw < 10$$

wherein;

f1: is the focal length of the first lens group;

f2: is the focal length of the second lens group;

f3: is the focal length of the third lens group; and fw: is the focal length of the overall zoom lens system at the maximum wide-angle state.

Another embodiment of a variable magnification zoom lens system in accordance with the present invention comprises: in order from the object side, a first lens group having a negative refractive power;

a second lens group having a positive refractive power, in which the lens at the maximum image side is a positive meniscus lens having a convex surface facing toward the object side; and a third lens group having a positive refractive power; wherein the first and second lens groups are arranged relative to one another such that when zooming from the maximum wide-angle state to the telephoto state, the distance between the first lens group and the second lens group is decreased and at the same time, the distance between the second lens group and the third lens group is increased; and the following conditions are fulfilled:

$1 < (rR + rF)/(rR - rF) < 2$ $0.8 < fP/f2 < 1.6$ wherein rF is: the paraxial radius of curvature of the object side surface of the positive meniscus lens;

rR is: the paraxial radius of curvature of the image side surface of the positive meniscus lens;

fP is: the focal length of the positive meniscus lens; and f2 is: the focal length of the second lens group.

DETAILED DESCRIPTION OF THE PREFERRED EMBODIMENTS

Figure 1:
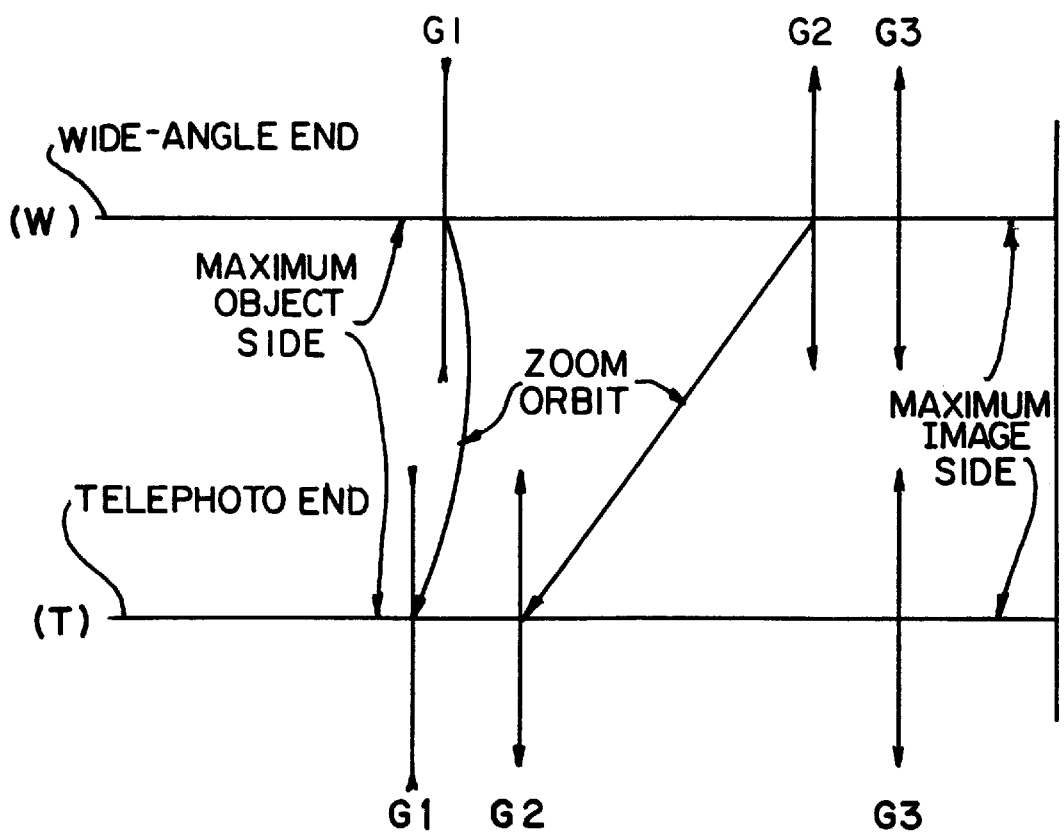
FIG. 1 is a diagram showing the layout of refractive powers in the variable magnification optical system of the present invention, and showing how each of the first and second lens groups move relative to one another and to the third lens group while changing magnification from the maximum wide-angle end (W) to the maximum telephoto end (T) in each of the embodiments of the present invention.

Zoom lenses can be classified into two general types:

(1) a first zoom lens type having a lens group which has a positive refractive power at the maximum image side; and (2) a second zoom lens type having a lens group which has a negative refractive power at the maximum image side.

Note that when a lens group, which does not contribute to zooming effect, is attached to the maximum image side of the lens system, the type of zoom lens is determined by the refractive power of the lens group which is the neighbor to the object side of the maximum image side lens group.

It should be further noted that in the first zoom lens type, the exit pupil is distanced from the image while in the second zoom lens type, the exit pupil is close to the image. A typical zoom lens of the second type camera may be a zoom lens with a positive-negative or a positive-positive negative lens construction for a lens shutter type camera.

In the zoom lens having a positive-negative or positive-positive-negative lens construction, a negative lens group is arranged at the maximum image side in the system to reduce the lens diameter or the entire length of the lens system, thus making back focus short in the maximum wide-angle state. At this time, the off axial light beams emitted from the negative lens group reach the image plane at an angle which is large with respect to the optical axis. For this reason, when recording an image by means of an image sensor having a micro lens array, the amount of light beams which reaches the image sensor around the periphery of an image is reduced, and a lack of light intensity is caused. This lack of light intensity tends to be easily observed. In addition, in a zoom lens having one of these types of lens construction, the movement of the negative lens group corresponding to the change in the lens' positional state from the maximum wide-angle state to the maximum telephoto end, changes largely in the exit angle of the off axial light beams which are emitted from the negative lens group. This makes it difficult to position the exit pupil where no light beam is failed by a micro lens array throughout the zooming range.

The first zoom lens type can be further classified into two groups:

a positive lead type in which the lens group arranged at the maximum object side has a positive refractive power; and a negative lead type, in which the lens group arranged at the maximum object side has a negative refractive power.

For example, the positive lead type zoom lens may comprise:

a positive-negative-positive-positive construction;

a positive-negative-negative-positive construction and the like.

The negative lead type zoom lens may comprise:

a negative-positive-negative-positive construction and the like.

In the positive lead type zoom lenses, when the positive lens group at the maximum image side is fixed during zooming and has an aperture stop, the exit pupil does not change its position corresponding to a zooming motion. Therefore, the zoom lens of this positive lead type is particularly suitable for TV cameras in which the exit pupil is near the infinitely far state and color separating prism is arranged in the back of the lens system. The lens system in which the exit pupil is positioned near the infinitely far state is called an image side telocentric optical system.

On the other hand, formation of an image side telocentric optical system imposes excessive constraints to the optical design, depriving one of diversity in designing. As a result, the number of lenses may be increased or the lens system may become too large. These are unfavorable factors to make a compact optical system.

In the positive lead type zoom lens, the second lens group having a negative refractive power is arranged on the image side of the first lens group having a positive refractive power so the light beams once converged by the first lens group are diverged by the second lens group. For this reason, when reducing the entire length of the lens, the magnitude of convergence must be increased in the first lens group or the magnitude of divergence must be decreased in the second lens group. However, if the magnitude of convergence is increased in the first lens group, the off axial light beams, which pass through the first lens group at the maximum wide angle state, will be kept off the optical axis which makes it difficult to reduce the lens diameter. On the other hand, if the magnitude of divergence is decreased in the second lens group, the off axial light beams, which pass through the second lens group, will be kept off the optical axis. Then the off axial light beams, which pass through the first lens group, will be kept off the optical axis, and it is difficult to reduce the lens diameter. Based upon this reasoning, there is a limitation in reduction of the lens diameter or of the entire length of the lens for a zoom lens of the positive lead type.

On the other hand, in the negative lead type zoom lens with the negative-positive-negative-positive construction, the lens system is composed of a larger number of lenses. As a result, the entire length of the lens system is longer and thus this is unfavorable for making a compact lens system.

Considering all the above, in a preferred embodiment of the present invention, a variable magnification optical system can comprise: in order from the object side, a first lens group G1 having a negative refractive power;

a second lens group G2 having a positive refractive power; and a third lens group G3 having a positive refractive power.

When changing magnification from the maximum wide-angle state, in which the focal length of the overall lens system is minimal, to the maximum telephoto state, in which the focal length of the overall lens system is maximum, the distance between the first lens group G1 and the second lens group G2 is reduced while the distance between the second lens group G2 and the third lens group G3 is increased. A compact variable magnification optical system with an exit pupil appropriately distanced from the image plane can be obtained if the variable magnification optical system is configured with each of the lens systems to function as above indicated and with the following four conditions fulfilled:

(I) the third lens group G3 is fixed during changing magnification;

(II) the second lens group G2 is moved toward the object side when changing magnification from the maximum wide-angle state to the maximum telephoto state;

(III) the second lens group G2 comprises: in order from the object side, a positive lens group portion G2P having a positive refiactive power; and a negative lens group portion G2N having a negative refractive power;

with an aperture stop positioned more toward the object side over the negative lens group portion G2N; and (IV) the lens position of the first lens group G1 in the maximum wide-angle state and that of the first lens group G1 at the maximum telephoto state closely correspond to each other.

It is preferred in accordance with the present invention, to keep the exit pupil and the image plane appropriately apart and the refractive power for the third lens group G3, which is arranged at the maximum image side in the lens system, kept positive. Now, when we say that the exit pupil is appropriately apart from the image plane, we include the case in which the exit pupil, being in the forward position (at the object side), is appropriately apart from the image plane and the case in which the exit pupil, being in a backward position (opposite of the object side), is appropriately apart. When the exit pupil is in the forward position from the image plane, the principal ray emitted from the lens surface at the maximum image side in the lens system reaches the image plane apart from the optical axis. Alternatively, when the exit pupil is in the backward position, the principal ray emitted from the lens surface of the maximum image side in the lens system reaches the image plane closer to the optical axis. In other words, when we say that the exit pupil is appropriately apart from the image plane, we mean that the angle made by the principal ray emitted from the lens system and the optical axis is appropriately small.

It is also preferred in accordance with the present invention for the principal ray emitted from the third lens group G3 to be nearly parallel to the optical axis. For this reason, the off axial light beams pass through the third lens group G3 apart from the optical axis, then the lens diameter becomes larger.

Therefore, it is preferred in accordance with the present invention for the third lens group G3 having a large lens diameter to be fixed in the optical axial direction during zooming. This makes the lens barrel compact. Also, by making the refractive power for the first lens group G1 negative, an appropriate back focus is obtained in the maximum wide-angle state.

To follow the above preferred practice, condition (I) is required.

It is also desirable in accordance with the present invention for a negative lens group to be arranged at the maximum object side in the lens system. To obtain an appropriate back focus in the maximum wide-angle state, the distance between the first lens group G1 and the second lens group G2 is larger. On the other hand, in the maximum telephoto state, the second lens group is positioned closer to the first lens group to reduce the entire lens length.

As described above, when zooming from the maximum wide angle state to the maximum telephoto state, it is desirable that the second lens group G2 be moved toward the object side such that condition (II) is fulfilled.

In the image side telocentric optical system, the chief rays emitted from the center of the aperture stop are emitted such that they are parallel through a lens system arranged more toward the image side over the aperture stop. In other words, the aperture stop is at the object side focal point of the lens system which was arranged toward the image side from the aperture stop. Therefore, to make the aperture stop closer to the image plane while making the exit pupil apart from the image plane, one can (a) reduce the focal length of the lens system arranged at the image side from the aperture stop; or (b) make the lens system arranged at the image side from the aperture stop to the inverse telephoto type which has a refractive power arrangement with the construction.

When reducing the focal length of a lens system arranged toward the image side from the aperture stop as mentioned in (a), the lens system arranged toward the image side from the aperture stop must be fast. As a result, aberration correction becomes difficult. This increases the number of lenses required to construct the lens system which, in turn, makes it difficult to obtain a compact lens system.

Therefore, it is preferred in accordance with the present invention for the refractive powers of the lens system arranged at the image side from the aperture stop to be arranged the inverse telephoto type as mentioned in (b). In other words, in the present invention, it is desirable that the negative sub-group G2N and the third lens group G3 having a positive refractive power are arranged toward the image side from the aperture stop. In this way, the thickness of the lens system can be decreased while the exit pupil is kept from the image plane and condition (III) will be fulfilled.

In the zoom lens of the negative-positive construction which is used for a single lens reflex camera and the like, the entire lens length can be minimized if the lens position in the first lens group in the maximum wide-angle state and that in the first lens group in the maximum telephoto state closely correspond to each other. This will fulfill condition (IV).

Also, in the present invention, the first lens group G1 moves only a small amount when zooming. Therefore, when the first lens group G1 is used as the focusing group (focusing lens group), the focusing movement of the first lens group G1 is nearly independent of the focal length of the lens system itself. Accordingly, when using the first lens group G1 as the focusing group works best to simplify the lens barrel structure.

There are important conditions that the present invention should desirably fulfill.

Condition (1) is characterized as follows:

$$0.4 < |f3/f1| < 0.8 \quad (1)$$

where f1: is the focal length of the first lens group G1; and f3: is the focal length of the third lens group G3.

Condition (1) defines an appropriate ratio for the focal lengths of the first lens group G1 to the third lens group G3.

If the upper limit of condition (1) is exceeded, divergent effect through the first lens group G1 will be too strong and reduction of the entire length of the lenses will be difficult. On the other hand, if the lower limit of condition (1) is exceeded, convergent effect through the third lens group G3 will be too strong. The position of the exit pupil in the maximum telephoto state will be closer to the image plane, the light beams will be failed by a micro lens array.

In accordance with the present invention, to reduce the entire length of the lenses and to increase the distance between the exit pupil and image plane at the same time, it is desirable that the second lens group G2 comprises the positive power lens group G2P and the negative sub-group G N, and it is desirable that the following condition (2) is fulfilled.

$$0.5 < Do/f2 < 0.8 \quad (2)$$

wherein;

f2: is the focal length of the second lens group G2; and

D2: is the distance between the maximum object side and the maximum image side on the axis in the second lens group G2, that is, the total thickness of the second lens group G2.

Condition (2) defines the ratio of the focal length to total thickness for the second lens group G2.

If the upper limit of condition (2) is exceeded, the reduction of the entire length of the lens will be difficult. On the other hand, if the lower limit of condition (2) is exceeded, refractive power of the positive sub-group G P. and the negative sub-group G 2N, which together constitute the second lens group G2, are increased. As a result, it becomes particularly difficult to correct off axial aberrations in the maximum wide-angle state, making it impossible to obtain desirable image quality.

It is preferred in accordance with the present invention that when changing the focal length from the maximum wide-angle state to the maximum telephoto state, the first lens group G1 and the second lens group G2 move in the optical axial direction. In order to reduce the entire length of the lenses, it is desirable that the position of the first lens group G1 at the maximum wide-angle state and at the maximum telephoto state correspond closely to each other. More particularly, to have the position of the first lens group G1 at the maximum wide-angle state and at the telephoto state correspond to each other it is desirable that the following conditions (3) and (4) be fulfilled.

$$0.9 < \beta 2T \cdot \beta 2W < 1.1 \quad (3)$$

$$0.4 < |f2|/|f1| < 0.7 \quad (4)$$

wherein;

β2W: is the lateral magnification of the second lens group G2 in the maximum wide-angle state; and β2T: is the lateral magnification of the second lens group G2 in the maximum telephoto state.

Condition (3) defines the range for the lateral magnification of the second lens group G2 between the maximum wide-angle state and the maximum Telephoto state.

If the upper limit of condition (3) is exceeded, the entire length of the lens becomes too long in the maximum telephoto end compared to that in maximum wide-angle end, the reduction of the entire length of the lens will be difficult. On the other hand, if the lower limit of condition (3) is exceeded, the entire length of the lens becomes too long in the maximum wide-angle state compared to that in the maximum telephoto end, making it difficult to reduce the entire length of the lens.

Condition (4) defines an appropriate range for the ratio of the focal length of the first lens group G1 and the focal length of the second lens group G2.

If the upper limit of condition (4) is exceeded, the reference power of the second lens group becomes weak, then it is difficult to reduce the entire length of lens. On the other hand, if the lower limit of condition (4) is exceeded, it becomes particularly difficult to correct off axial aberrations occurred in the second lens group G2 excellently, making it impossible to obtain desirable image quality.

In the present invention, it is important for the displacement or amount of movement of the exit pupil to be minimized during the changing of the focal length of the overall lens system from the maximum wide-angle state to the maximum telephoto state. This will prevent the lens system from the micro lens array mounted on a CCD failing light beam. Accordingly, it is desirable that the following condition (5) be fulfilled.

$$M2/|f2N| < 4 \quad (5)$$

where

M2: is the moving amount or displacement of the second lens group G2 in the optical axial direction when changing magnification from the maximum wide-angle state to the maximum telephoto state; and f2N: is the focal length of the negative sub-group G 2N.

Condition (5) defines an appropriate range for the ratio of the moving amount of the second lens group G2 to the focal length of the negative sub-group G 2N.

If the upper limit of condition (5) is exceeded, the moving amount of the exit pupil increases when the focal length of the entire lens system is changed from the maximum wide-angle state to the maximum telephoto state. As a result, in the maximum wide-angle state or the maximum telephoto state, light beams are failed by the micro lens array.

In accordance with a preferred embodiment of the present invention, the positive subgroup G2P is constructed with two lenses, and the negative subgroup G2N is constructed with two lenses. In this way, one can obtain a compact and high performance lens system with a small number of lenses with excellent spherical aberration correction capability.

As described herein, in each of the embodiments of the present invention, each of the lens groups are constructed with a small number of lenses. However, increasing the number of lenses in each of the lens groups makes it easier to obtain a higher zoom ratio or higher performance in a zoom lens system. In addition, by introducing an aspherical surface on the lens surface, one can obtain a higher zoom ratio or high performance zoom lens system.

Particularly, by introducing an aspherical surface for the first lens group G1 or the third lens group G3 which are arranged apart from the aperture stop, the fluctuating coma aberrations due to the field angle can be corrected excellently. In addition, by introducing an aspherical surface to the positive sub-group G 2P or the negative sub-group G 2N which are arranged close to the aperture stop, the lens can be fast.

Also, by using plastic lenses, a reduction of weight and cost can be accomplished.

Note that if one of the lens groups among those which construct the optical system is moved in the optical axial direction, the image plane is moved in the optical axial direction and the focal length is changed.

In general, a lens system in which the deviation of the image plane position according to the movement of a lens group is corrected by moving another lens group in the axial direction may be called a zoom lens. However, the present invention is not limited to a zoom lens and is instead applicable to a so called "vari-focal lens", which is a variable magnification lens, in which the image plane position is moved slightly in the optical axial direction or the focusing group is moved in the optical axial direction such that the image plane position corresponds to the image plane of the imaging sensor in the lens system.

In addition when using a zoom lens of a high magnification ratio, camera shaking and the like are more likely to occur when operating the camera. To prevent the camera from shaking, a shake detection system which measures the deviation generated in the optical system and the drive means can be built into a lens system. The image blur (the deviation of the image position) caused by camera shaking is measured by the shake detection system and is corrected by eccentrically moving either the entire or a part of the lens group. In this way, the zoom lens system of the present invention can be used as an anti-vibration optical system.

In another preferred embodiment of the present invention, a negative refractive power is given to the first lens group G1 and a positive refractive power is given to the second lens group G2 and a positive refractive power is given to the third lens group G3 which is at the image side second lens group G2. In this way, the exit pupil position can be kept appropriately off the image plane which is suitable for a camera using a solid image sensor and the like. In this embodiment the first lens group G1 comprises, in order from the object side, two negative lenses and one positive lens. This arrangement is particularly effective in correcting lateral chromatic aberration and distortion excellently. The lens system can provide an excellent imaging performance for a solid image sensor having numerous pixels.

In addition, the third lens group G3 which is positioned closest to the imaging surface is fixed during zooming, therefore, the drive mechanism which drives the first lens group G1 and the second lens group G2 can be kept away from a solid image sensor or from electronic circuits connected to the solid image sensor.

In accordance with this embodiment the following conditions (6) and (7) should be fulfilled.

$$0.7 < f2/|f1| < 1.5 \quad (6)$$

$$3 < f3/fW < 10 \quad (7)$$

where f1 is: the focal length of the first lens group G1;

f2 is: the focal length of the second lens group G2;

f3 is: the focal length of the third lens group G3; and fW is: the focal length of the overall lens system at the maximum wide-angle end.

Condition (6) is the condition which can provide a zoom ratio of 2.5× or larger and has the capability to reduce the size of a zoom lens and provide excellent imaging performance. It defines an appropriate ratio for the focal length of the second lens group G2 to the focal length of the first lens group G1.

If the lower limit of condition (6) is exceeded, it will be difficult to obtain a desired zoom ratio. Changing the distance between the first lens group G1 and the second lens group G2 will increase during zooming which makes it difficult to reduce the size of a zoom lens system.

On the other hand, if the upper limit of condition (6) is exceeded, correction of distortion, lateral chromatic aberration and field curvature become difficult. As a result, an excellent imaging performance cannot be obtained with a simple configuration.

Condition (7) defines the condition required to locate the exit pupil correctly and to provide the capability to reduce the size of a zoom lens system. It also defines an appropriate range for the focal length of the third lens group G3.

If the upper limit is exceeded, it will be difficult to keep the exit pupil off the image surface at an appropriate distance. It will also be difficult to provide a zoom lens which is suited to a solid image sensor. On the other hand, if the lower limit of condition (7) is exceeded, the configuration of the third lens group G3 will become complicated or the size of the first lens group G1 and the second lens group G2 will increase. This makes it difficult to reduce the size of the entire zoom lens system.

In accordance with this embodiment and to also reduce tolerances, the first lens group G1 preferably comprises in order from the object side, a negative meniscus lens having a convex surface facing toward the object side;

a cemented lens which is made up of, a bi-concave lens; and a positive meniscus lens having a convex surface facing toward the object side.

In this case, to correct chromatic aberration and spherical aberration excellently, it is desirable that the following conditions (8) and (9) be fulfilled:

$$30 < v1 < 40 \quad (8)$$

$$0.25 < n3 - n2 \quad (9)$$

where v1 is: the Abbe number of the negative meniscus lens;

n2 is: the refiactive index of the bi-concave lens on the d-line; and n3 is: the refractive index of the positive meniscus lens on the d-line.

Condition (8) defines an appropriate range for the Abbe number of the negative meniscus lens in the first lens group G1.

If the upper limit and the lower limit of condition (8) are exceeded, accurate correction of longitudinal chromatic aberration and lateral chromatic aberration will be difficult which is unfavorable.

Condition (9) defines an appropriate range for the difference in the refractive index for the bi-concave lens and the positive meniscus lens necessary to construct a cemented lens in the first lens group G1.

If the lower limit of condition (9) is exceeded, it will be difficult to correct spherical aberration excellently which is not preferable. Moreover, to correct spherical aberration and coma aberration excellently, it is desirable that the second lens group G2 comprises: in order from the object side, two positive lenses;

one negative lens; and one positive lens.

And to correct spherical aberration and coma aberration more excellently, it is desirable that the second lens group G2 comprises; in order from the object side, two positive lenses; one negative lens; and two positive lenses.

To correct coma aberration excellently without making the configuration of the third lens group G3 complex and at the same time, to provide a compact zoom lens and excellent aberration correction capability, it is desirable that at least one of the surfaces of the third lens group G3 comprises a positive single lens having at least one aspherical surface. In this case, to correct coma aberration even more effectively, the positive single lens, is bi-convex and its image side surface is aspherical such that the positive refractive power is reduced from the optical axis to the periphery.

In accordance with this embodiment of the present invention, the lens, which is closest to the image in the second lens group G2, is a positive meniscus lens having a convex surface facing toward the object side. Even if the exit pupil is kept farther away from the image plane, spherical aberration and coma aberration can be corrected excellently from the maximum wide-angle state to the maximum telephoto state.

In accordance with this embodiment the following conditions (10) and (11) should be fulfilled:

$$1 < (rR + rF)/(rR - rF) < 2 \quad (10)$$

$$0.8 < fP/f2 < 1.6 \quad (11)$$

where rF is: the paraxial radius of curvature of the object side surface of a positive meniscus lens which is arranged closest to the image plane in the second lens group G2;

rR is: the paraxial radius of curvature of the image side of the positive meniscus lens which is arranged closest to the image plane in the second lens group G2;

fP is: the focal length of the positive meniscus lens which is arranged closest to the image plane in the second lens group G2; and f2 is: the focal length of the second lens group.

Condition (10) defines an appropriate shape for the positive meniscus lens in the second lens group G2. To correct spherical and coma aberrations from the maximum wide-angle end to the maximum telephoto end this condition (10) should preferably be fulfilled. If the lower limit of condition (10) is exceeded, it will be difficult to correct spherical aberration excellently. On the other hand, if the upper limit of condition (10) is exceeded, it will be difficult to correct coma aberration excellently.

Condition (11) defines an appropriate range for the focal length of the positive meniscus lens in the second lens group G2. To obtain an appropriate back focus as required when arranging the members, such as a low-pass filter at the image plane side of the zoom lens system, and to correct spherical and coma aberrations excellently the fulfillment of condition (11) is preferable. If the lower limit of condition (11) is exceeded, it will be difficult to correct spherical and coma aberrations excellently. On the other hand, if the upper limit of condition (11) is exceeded, it will be difficult to obtain an appropriate back focus.

In accordance with the present invention it is desirable during zooming from the maximum wide-angle state to the maximum telephoto state for the first lens group G1 and the second lens group G2 to move and for the third lens group G3, which is positioned closest to the field plane to be fixed. With this configuration, it will be possible to arrange the drive mechanism for zooming away from the solid image sensor or from an electronic circuit which is connected to the solid image sensor.

In accordance with this preferred mode of operation of the present invention, it is desirable that the following condition (12) be fulfilled:

$$0.3 < hR/fW < 0.5 \qquad (12)$$

where hR is: the height from the optical axis at the position at which the principal ray enters to the image side surface of the positive meniscus lens in the second lens group G2;

fW is: the focal length of the zoom lens system at the maximum wide-angle state.

If the lower limit of condition (12) is exceeded, it will be difficult to keep the exit pupil and the image plane appropriately far from each other which is not preferable.

In accordance with yet another embodiment of the present invention, it is desirable that the object side of the positive meniscus lens in the second lens group G2 be aspherical such that the positive refractive power is reduced at the periphery from the positive refractive power at the optical axis. By introducing an aspherical surface, spherical and coma aberrations can be corrected even better.

In another embodiment of the variable magnification zoom lens system of the present invention, it is desirable that the second lens group G2 comprises: in order from the object side, a first positive lens;

a second positive lens;

a first negative lens; and a positive meniscus lens having a convex surface facing toward the object side.

With this configuration, if the second positive lens and the first negative lens in the second lens group G2 are combined, the zoom lens can be assembled easily and the decentering tolerance can be relieved which is even more preferable.

Also, in yet another embodiment of the present invention, the second lens group G2 comprises: in order from the object side a first positive lens;

a second positive lens;

a first negative lens;

a third positive lens; and a positive meniscus lens having a convex surface facing toward the object side.

With this configuration, if the second positive lens and the first negative lens in the second lens group G2 are combined, the zoom lens system can be assembled easily, and decentering tolerance can be relieved which is even more preferable.

Also in the zoom lens system of the present invention, it may be desirable for the third lens group G3 to comprise a positive single lens having at least one aspherical surface. With this configuration, coma aberration can be corrected excellently without making the configuration of the third lens group complex. A compact zoom lens system can be obtained and excellent aberration capability can be obtained at the same time.

In accordance with this embodiment of the present invention, it is desirable that the following condition (13) is fulfilled:

$$1.5 < f2/fW < 3.0 \qquad (13)$$

where f2 is: the focal length of the second lens group G2; and fW is: the focal length of the zoom lens system at the maximum wide-angle state.

A compact zoom lens system with excellent imaging performance can be obtained by fulfilling condition 13. If the lower limit of condition (13) is exceeded, it will be difficult to obtain excellent imaging performance. On the other hand, if the upper limit of condition (13) is exceeded, it will be difficult to obtain a compact zoom lens.

Also, in accordance with the present invention, it is desirable that the following condition (14) be fulfilled:

$$1.5 < f3/f2 < 4.0 \qquad (14)$$

where f2 is: the focal length of the second lens group G2; and f3 is: the focal length of the third lens group G3.

It will be easy to keep an exit pupil far apart from the image plane in a zoom lens system. If the upper limit of condition (14) is exceeded, it will be difficult to keep an exit pupil far apart from the image plane. On the other hand, if the lower limit of condition (14) is exceeded, it will be difficult to correct aberrations excellently.

Each of the embodiments of the present invention will be described with reference to the attached drawings.

FIG. 1 is a diagram showing the layout of refractive powers in the variable magnification optical system and how each of the lens groups move while changing magnification from the maximum wide-angle end (W) to the maximum telephoto end (T) in each of the embodiments of the present invention.

As is shown in FIG. 1, the zoom lens system of each of the embodiments of the present invention comprises: in order from the object side, a first lens group G1 having a negative refractive power;

a second lens group G2 having a positive refractive power; and a third lens group G3 having a positive refractive power.

When changing magnification from the maximum wide-angle state to the maximum telephoto state, the distance between the first lens group G1 and the second lens group G2 is decreased;

the distance between the second lens group G2 and the third lens group G3 is increased;

the first lens group G1 and the second lens group G2 move independently from each other in the optical axial direction; and the third lens group G3 is fixed in the optical axial direction.

In each of the embodiments described herein, an aspherical surface is expressed by the following mathematical formula:

$$S(y) = \frac{y^2}{r\left(1 + \sqrt{1 - K\frac{y^2}{r^2}}\right)} + \ldots + C4 \cdot y^4 + C6 \cdot y^6 + C8 \cdot y^8 + C10 \cdot y^{10} \quad (a)$$

Note that in each of the embodiments an aspherical surface is marked * on the right hand side of the surface number.

Embodiment 1

Figure 2:
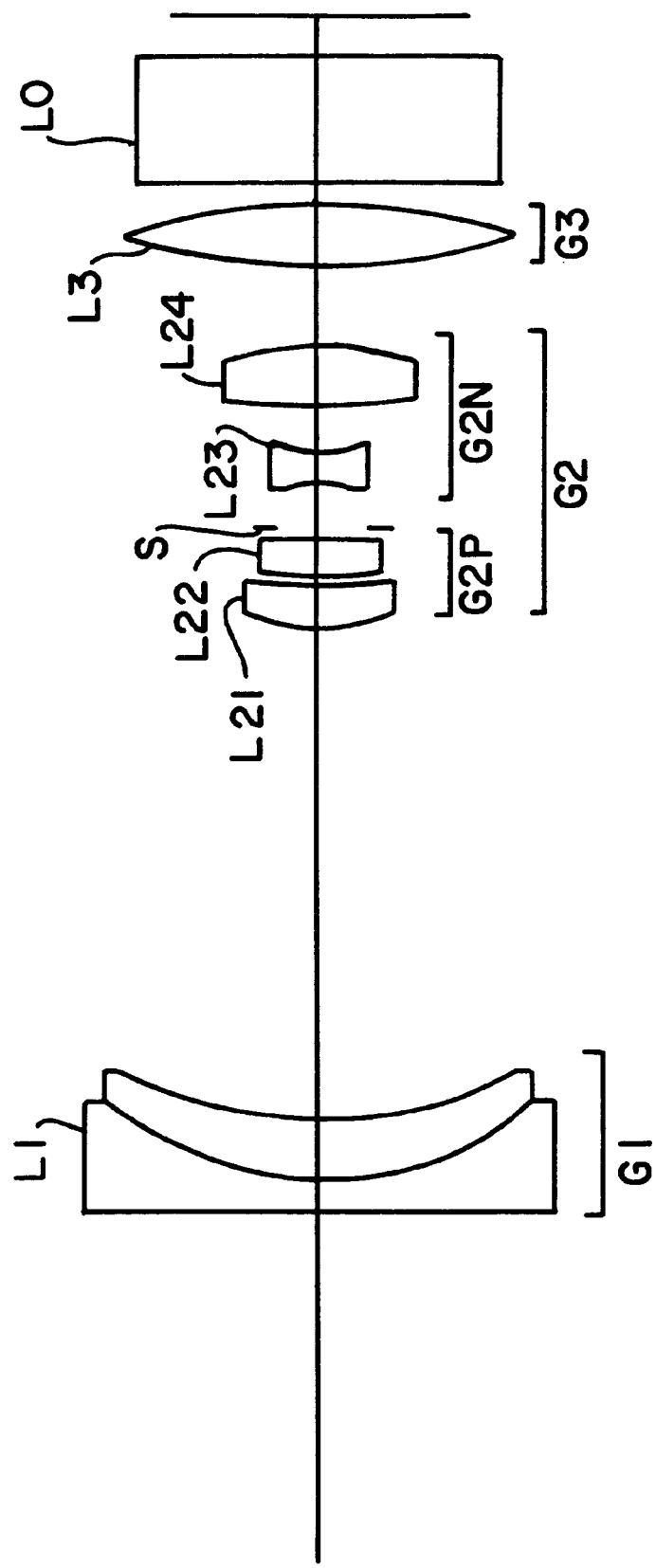
FIG. 2 is a configuration showing a variable magnification optical system of Embodiment 1 of the present invention.
Figure 3:
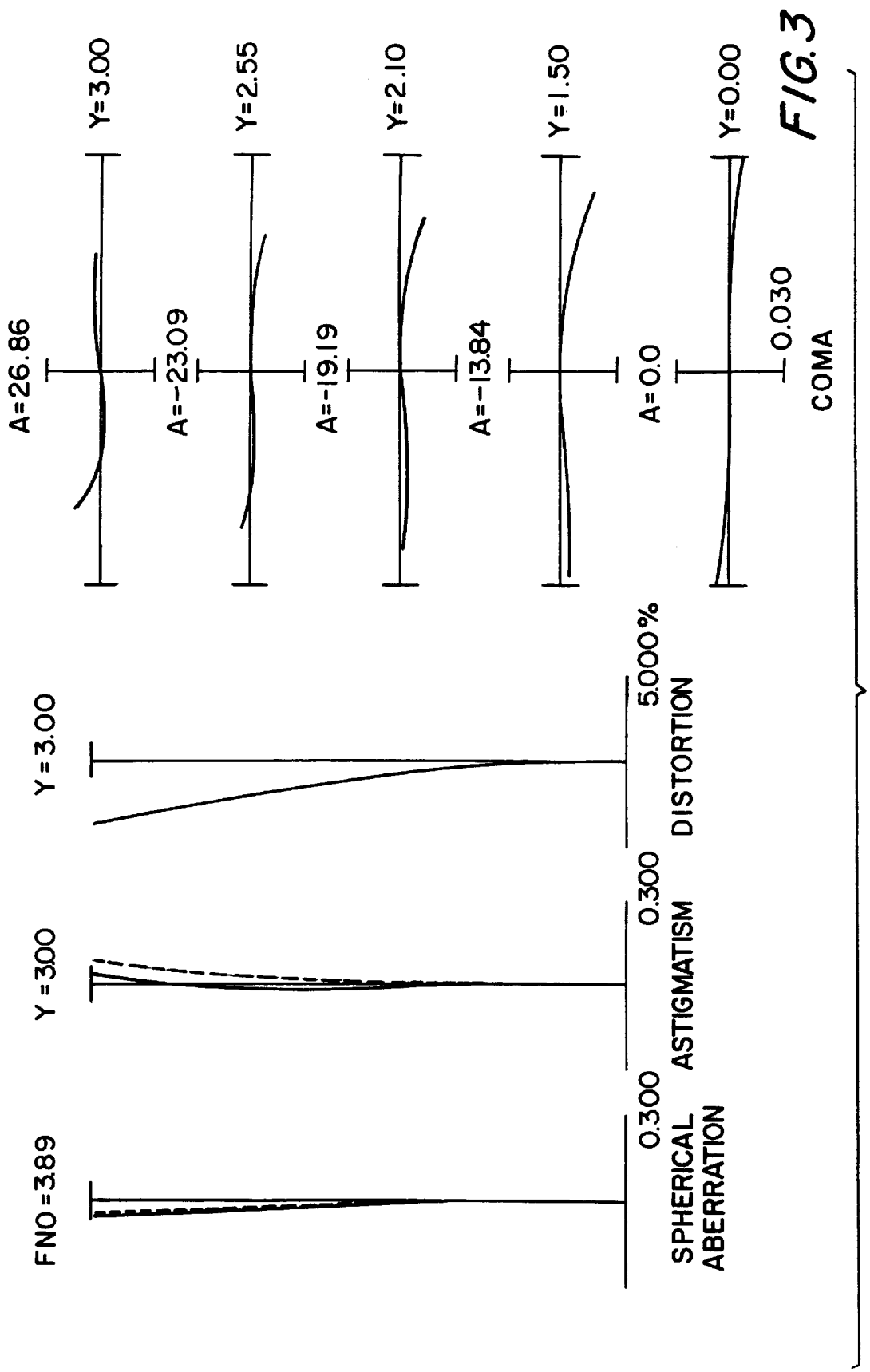
FIG. 3 shows various aberration curves of Embodiment 1 at the wide-angle end state in the infinitely far focusing state.
Figure 4:
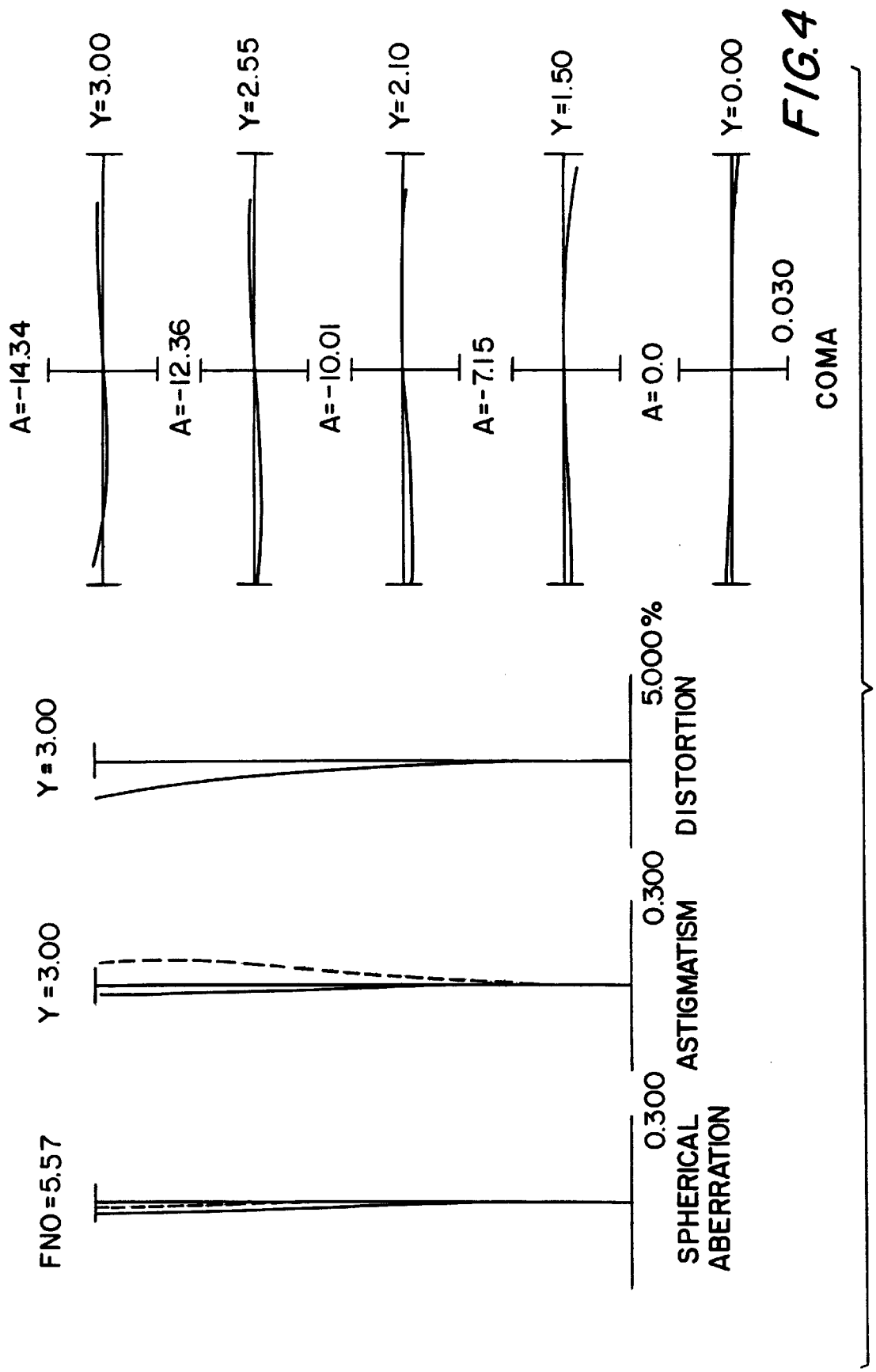
FIG. 4 shows various aberration curves of Embodiment 1 at the mid focal length state in the infinitely far focusing state.
Figure 5:
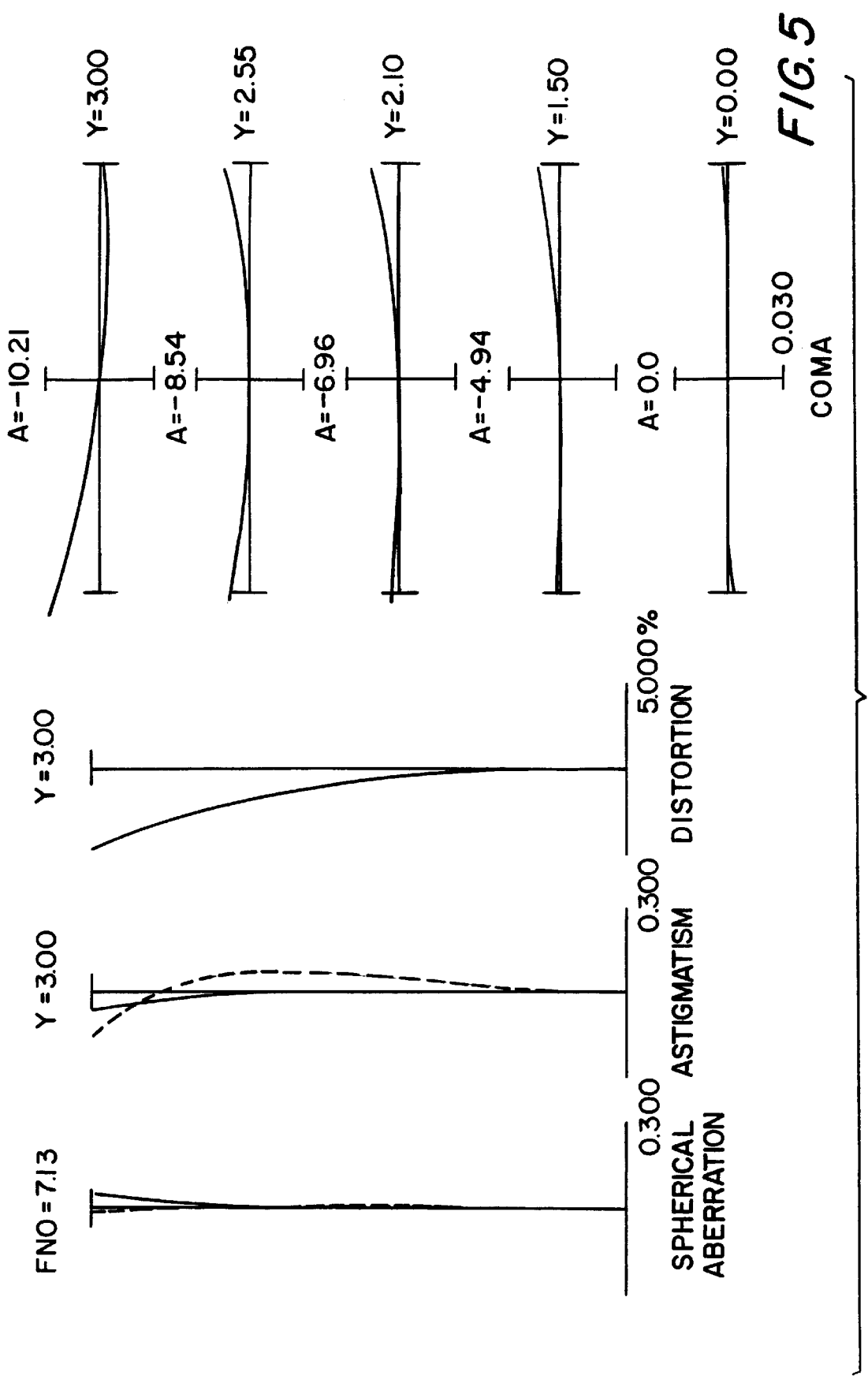
FIG. 5 shows various aberration curves of Embodiment 1 at the maximum telephoto end state in the infinitely far focusing state.
Figure 6:
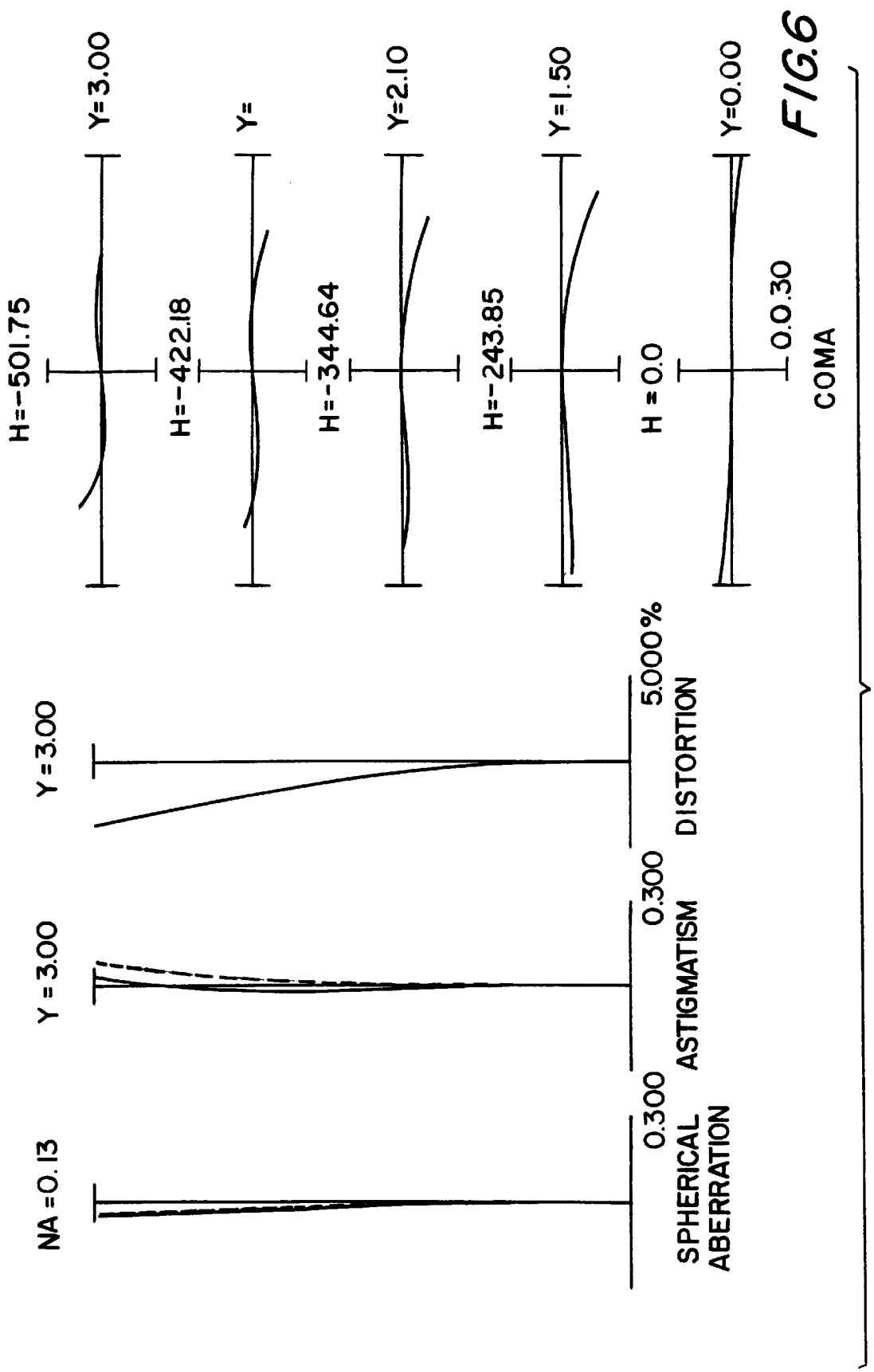
FIG. 6 shows various aberration curves of Embodiment 1 at the image magnification ratio of −0.01× at the maximum wide-angle end.
Figure 7:
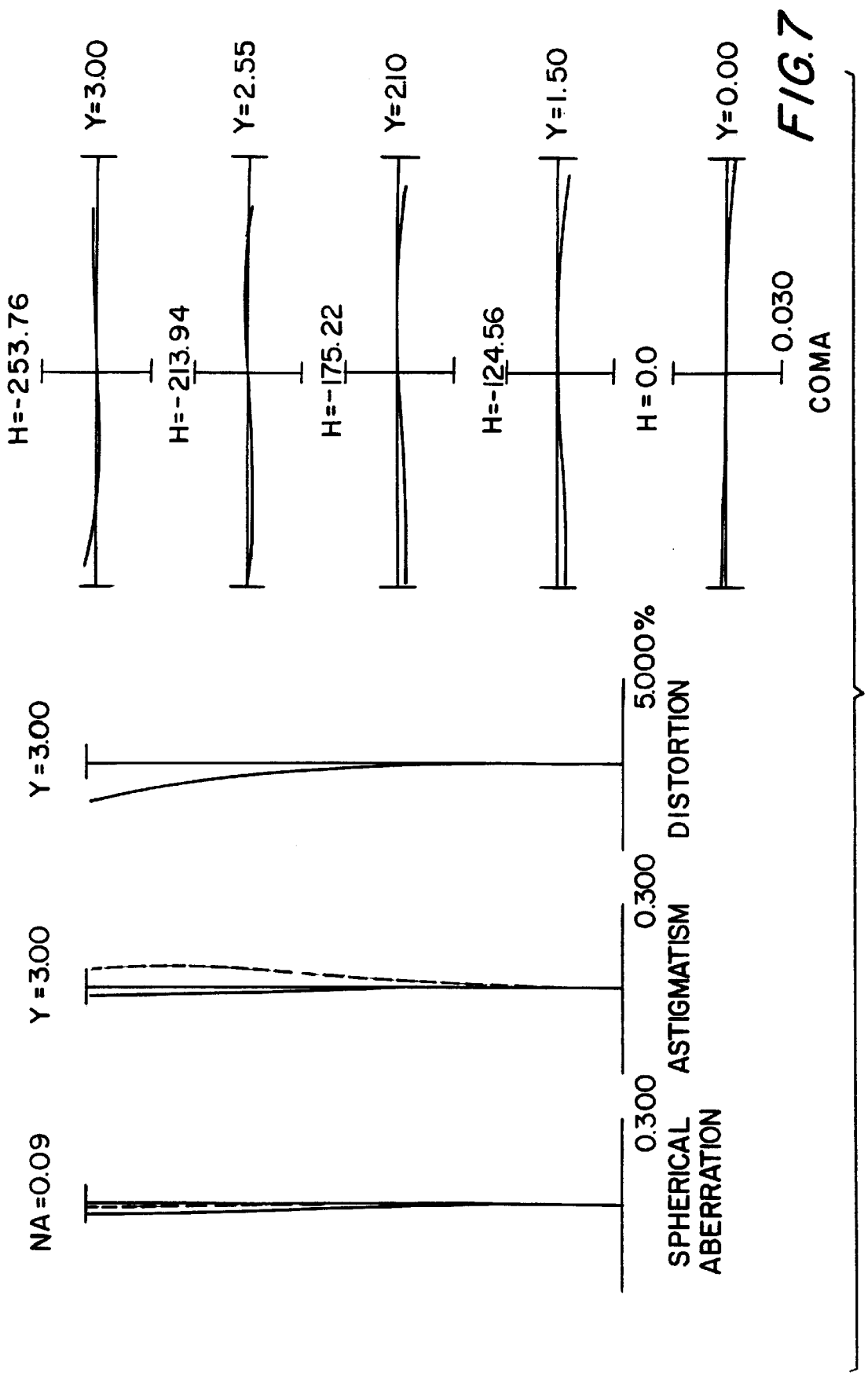
FIG. 7 shows various aberration curves of Embodiment 1 at the image magnification ratio of −0.01× at the mid focal length state.
Figure 8:
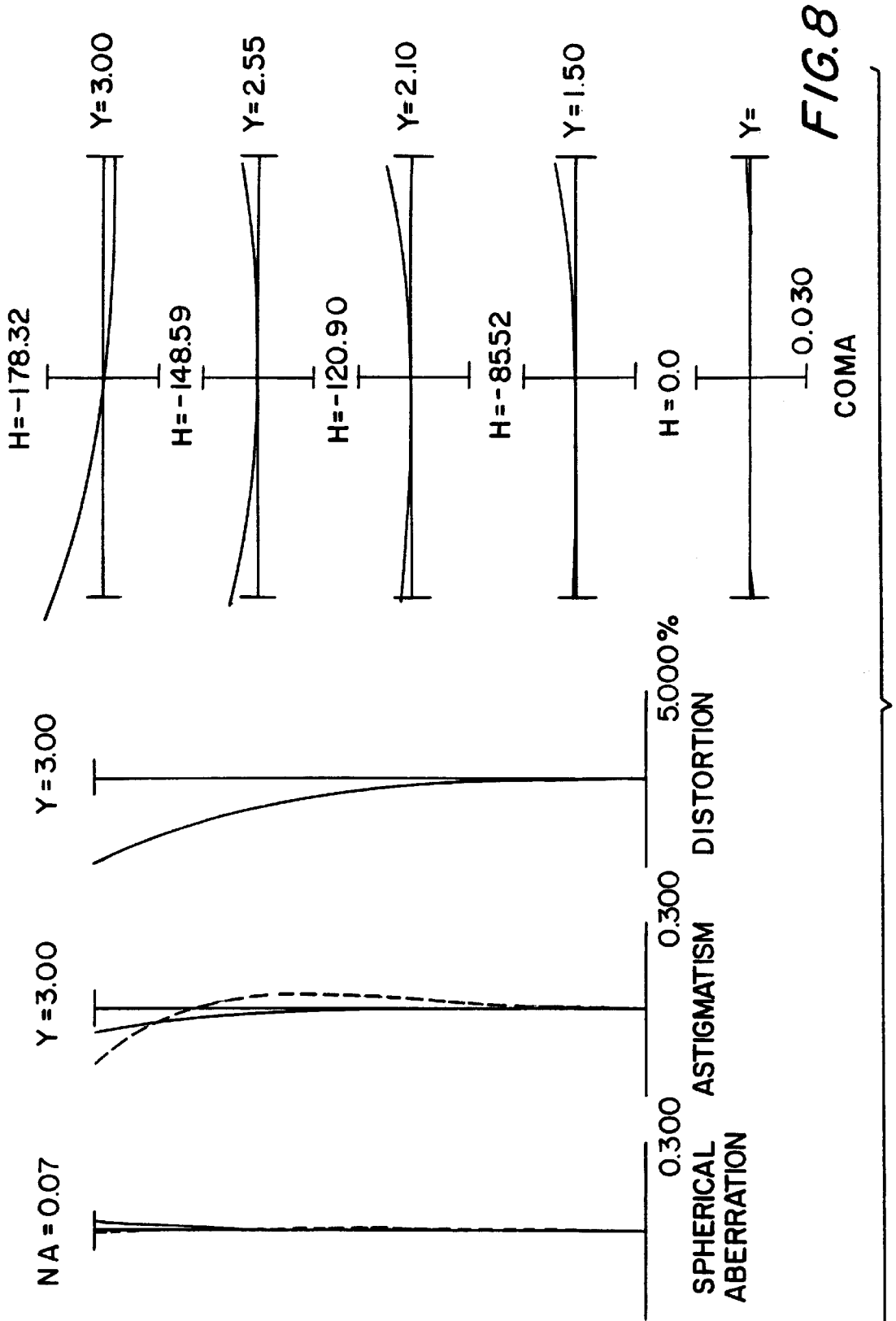
FIG. 8 shows various aberration curves of Embodiment 1 at the image magnification ratio of −0.01× at the maximum telephoto end.

FIG. 2 is a configuration showing the preferred variable magnification optical system of Embodiment 1 of the present invention.

In the zoom lens system of FIG. 2, the first lens group G1 is made up of a negative composite lens L1 comprising: in order from the object side,
  a negative meniscus lens having a convex surface facing toward the object side and a positive meniscus lens having a convex surface facing toward the object side.

Also, the second lens group G2 comprises: in order from the object side,
  a positive sub-group G p., which is made up of a positive meniscus lens L21 having a convex surface facing toward the object side and a positive meniscus lens L22 having a convex surface facing toward the object side; and
  a negative sub-group G n made up of a bi-concave lens L23 and a bi-convex lens L24.

In addition, the third lens group G3 is made up of a bi-convex lens L3.

An aperture stop S is arranged between positive sub-group G2P and negative sub-group G n and the aperture stop S moves integral with the second lens group G2 when magnification is changed.

FIG. 2 shows the positional relationship among each of the lens groups in the maximum wide-angle state. When magnification is changed to the maximum telephoto state, the lens groups move on the optical axis along the zooming orbit as indicated with an arrow in FIG. 1. Note that the third lens group G3 is fixed in the optical axial direction when magnification is changed.

Also, focusing from the infinitely far object to the near object is performed by moving the first lens group G1 to the object side along the optical axis.

A float glass LO is arranged between the third lens group G3 and the image plane as a protective glass. The float glass LO is fixed in the axial direction when magnification is changed.

In Table (1), various values of Embodiment 1 are shown. In Table (1), f is the focal length; F NO is an F number; 2ω is field angle; Bf is back focus; YO is the maximum image height; and D0 is a distance between the object and the plane at the maximum object side on the optical axis. The surface number indicates the order of the lens surface from the object side in the direction in which light progresses. The refractive index and Abbe number correspond to the values measured on the d-line (λ=587.6 nm). The surface with the curvature radius of ∞ indicates a flat surface.

TABLE 1 f = 6.15~12.00~17.50
F N0 = 3.89~5.57~7.13
2ω = 53.72~28.68~20.42°
Y0 = 3.00

| Surface No. | Radius of Curvature | Surface Separation | Refractive Index | Abbe Number | |
|---|---|---|---|---|---|
| 1 | 473.7284 | 0.800 | 1.71300 | 53.93 | |
| 2 | 7.5834 | 1.500 | 1.84666 | 23.83 | |
| 3 | 10.7996 | (d3 = variable) | | | |
| 4 | 4.4943 | 1.050 | 1.65160 | 58.44 | |
| 5 | 17.4628 | 0.100 | | | |
| 6 | 5.2089 | 1.050 | 1.62041 | 60.35 | |
| 7 | 758.6627 | 0.300 | | | |
| 8 | ∞ | 1.000 | | | (Aperture Stop S) |
| 9 | −5.1845 | 0.800 | 1.79504 | 28.56 | |
| 10 | 3.8581 | 1.146 | | | |
| 11 | 20.6146 | 1.400 | 1.74400 | 45.00 | |
| 12 | −8.1272 | (d12 = variable) | | | |
| 13 | 15.6141 | 1.500 | 1.77250 | 49.61 | |
| 14 | −14.2260 | 0.500 | | | |
| 15 | ∞ | 3.050 | 1.51680 | 64.20 | (Protection Glass L0) |
| 16 | ∞ | (Bf) | | | |

(Variable Lens Separation Values during Zooming in Motion)

| f | 6.1500 | 12.0000 | 17.5000 |
|---|---|---|---|
| d3 | 11.9077 | 3.5586 | 0.8000 |
| d12 | 1.8955 | 7.6207 | 13.0033 |
| Bf | 1.0000 | 1.0000 | 1.0000 |

(Moving Amount δ1 of a First Lens Group G1 for focusing at the magnification 0.01x)

| Focal Length f | 6.1500 | 12.0000 | 17.5000 |
|---|---|---|---|
| D0 | 596.1834 | 1181.1869 | 1731.1947 |
| Moving Amount δ1 | 0.4833 | 0.2477 | 0.1698 |

Note that the amount moved toward the object side is regarded as a positive movement.

(Values Corresponding to the Condition)
f3=9.852
f1=−17.240
Do=6.846
f2=10.153
β2W=−0.593
β2T=−1.687
M2=11.108
fn=−6.289
(1)f3/|f1|=0.566
(2)Do/f2=0.674
(3)β2T/β2W=1.000
(4)f2/|f1|=0.583
(5)M2/|fn|=1.766

FIGS. 3 through 8 are aberration curves on the d-line ($\lambda$=587.6) in Embodiment 1.

In each of the aberration curves of FIGS. 3–8, F No is an F number, NA is numerical aperture, Y is the image height, A is angle of incidence and H is the object height.

In an aberration curve showing astigmatism, a solid line shows a sagittal image plane and a dotted line shows a meridional image plane. In an aberration curve showing spherical aberration, a dotted line shows a sine condition.

As is apparent from each of the aberration curves, this embodiment corrects various aberrations excellently in each of the objective distance states and focal length states, demonstrating an excellent imaging performance.

Embodiment 2

Figure 9:
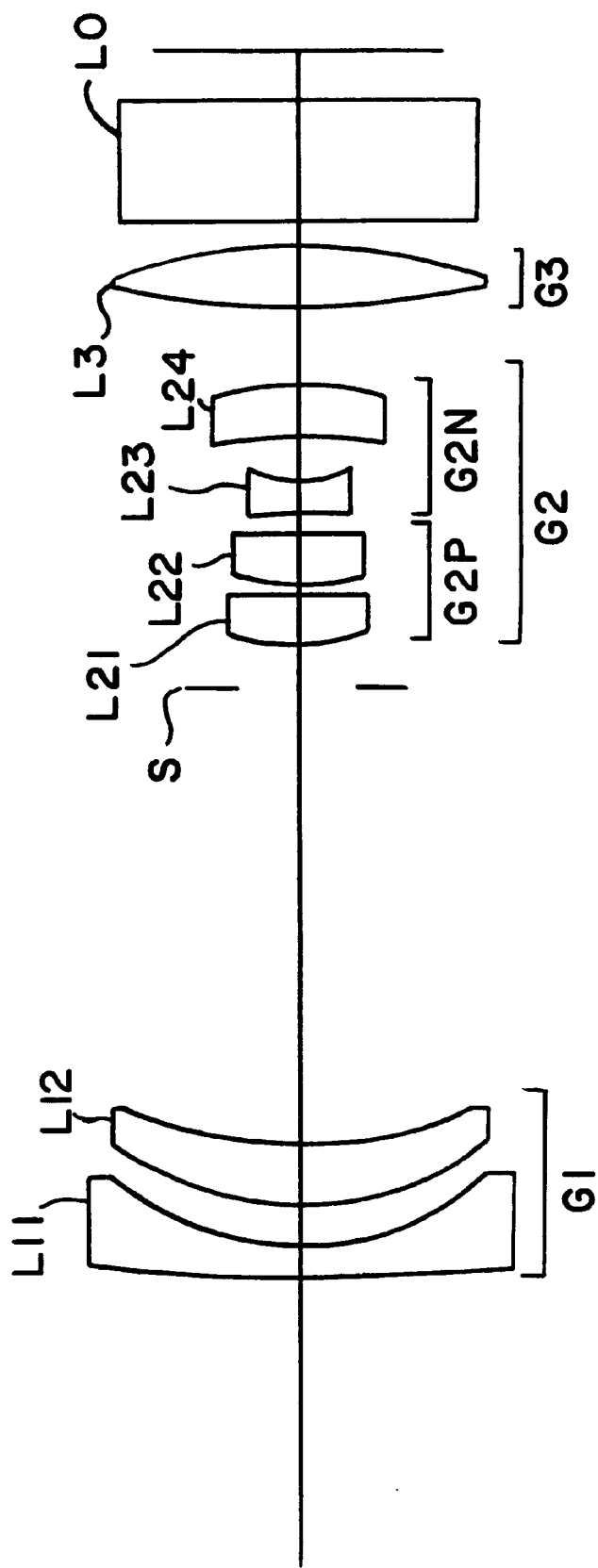
FIG. 9 is a configuration showing a variable magnification optical system of Embodiment 2 of the present invention.
Figure 10:
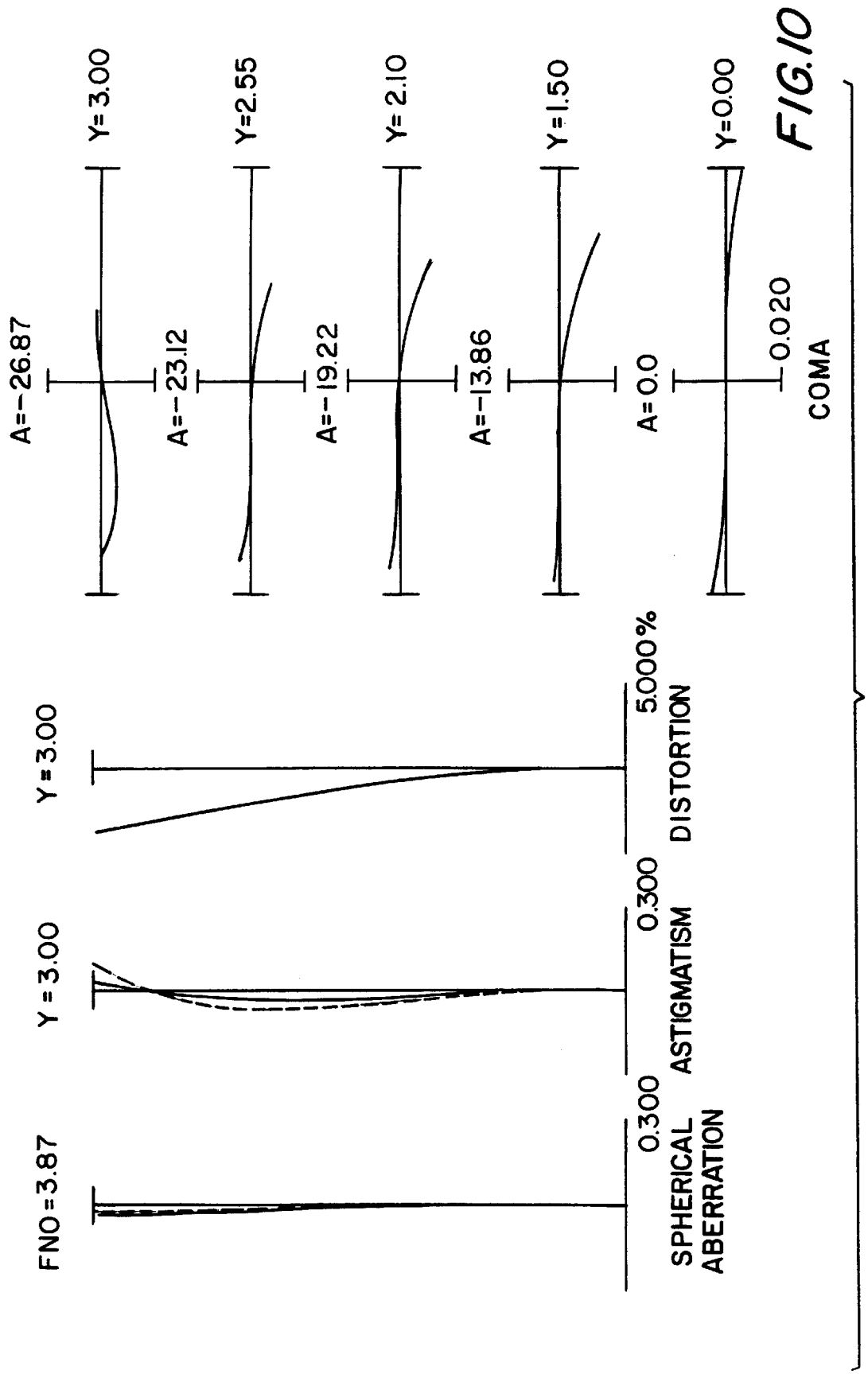
FIG. 10 shows various aberration curves of Embodiment 2 at the wide-angle end state in the infinitely far focusing state.
Figure 11:
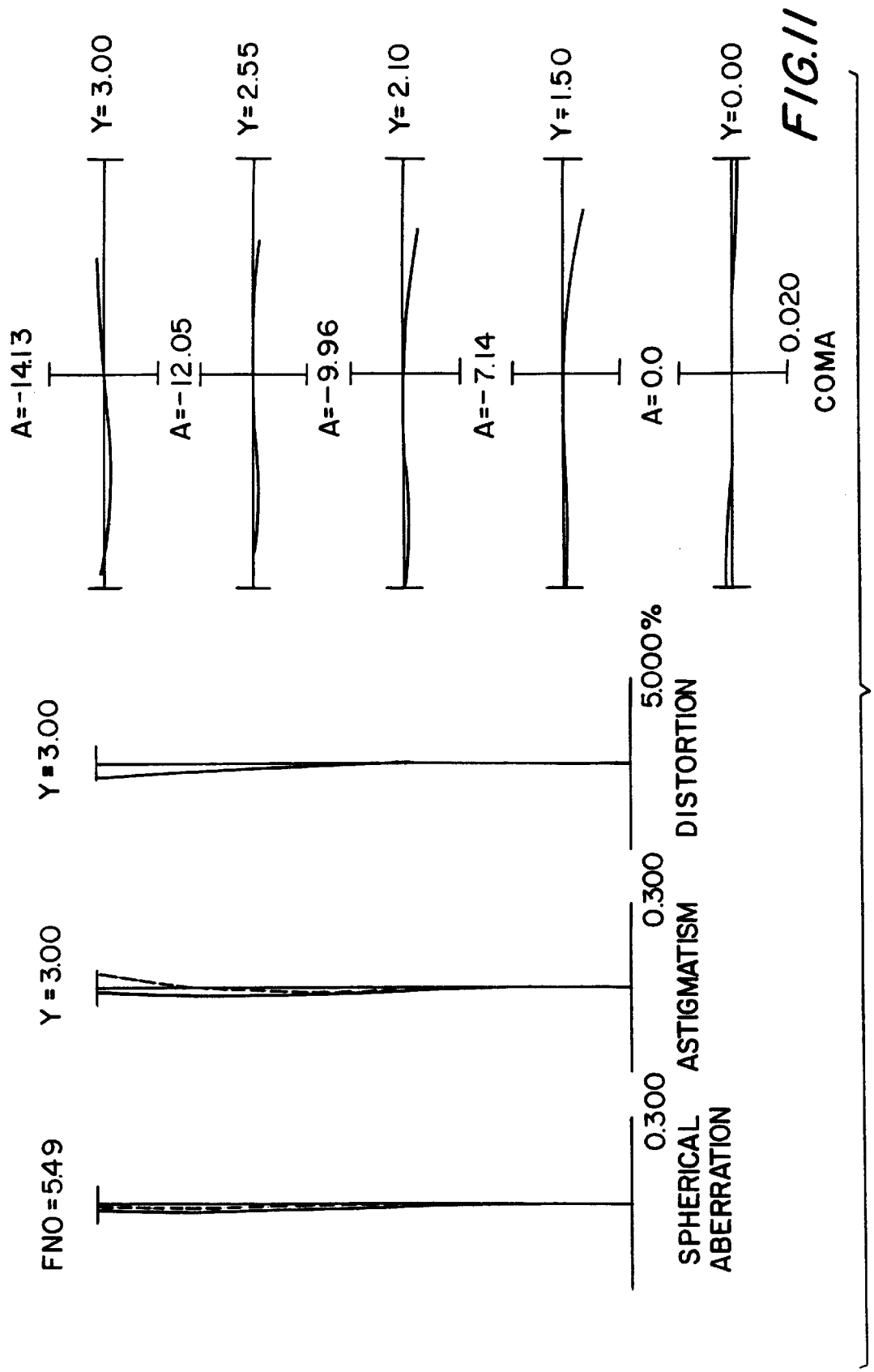
FIG. 11 shows various aberration curves of Embodiment 2 at the mid focal length state in the infinitely far focusing state.
Figure 12:
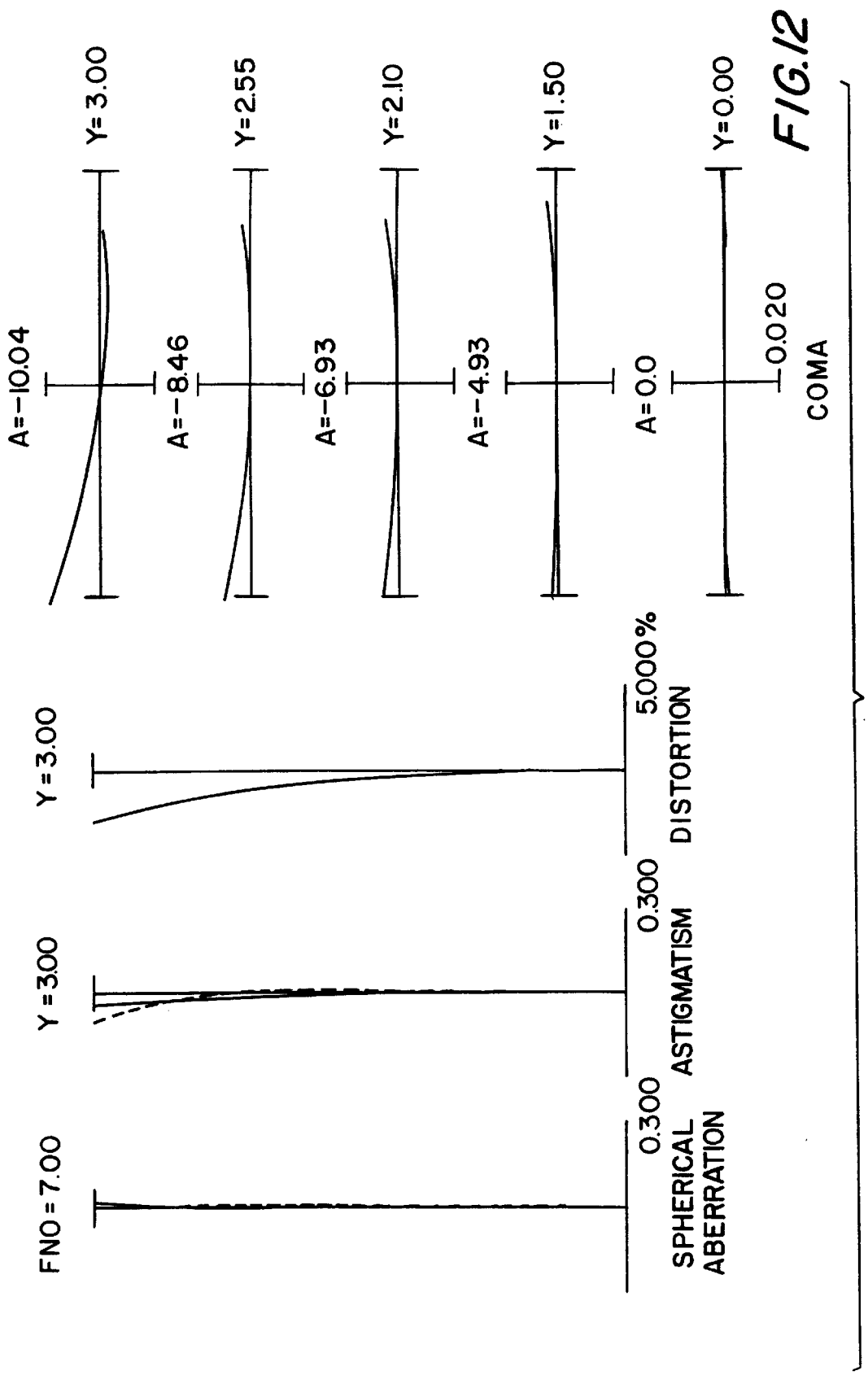
FIG. 12 shows various aberration curves of Embodiment 2 at the maximum telephoto end state in the infinitely far focusing state.
Figure 13:
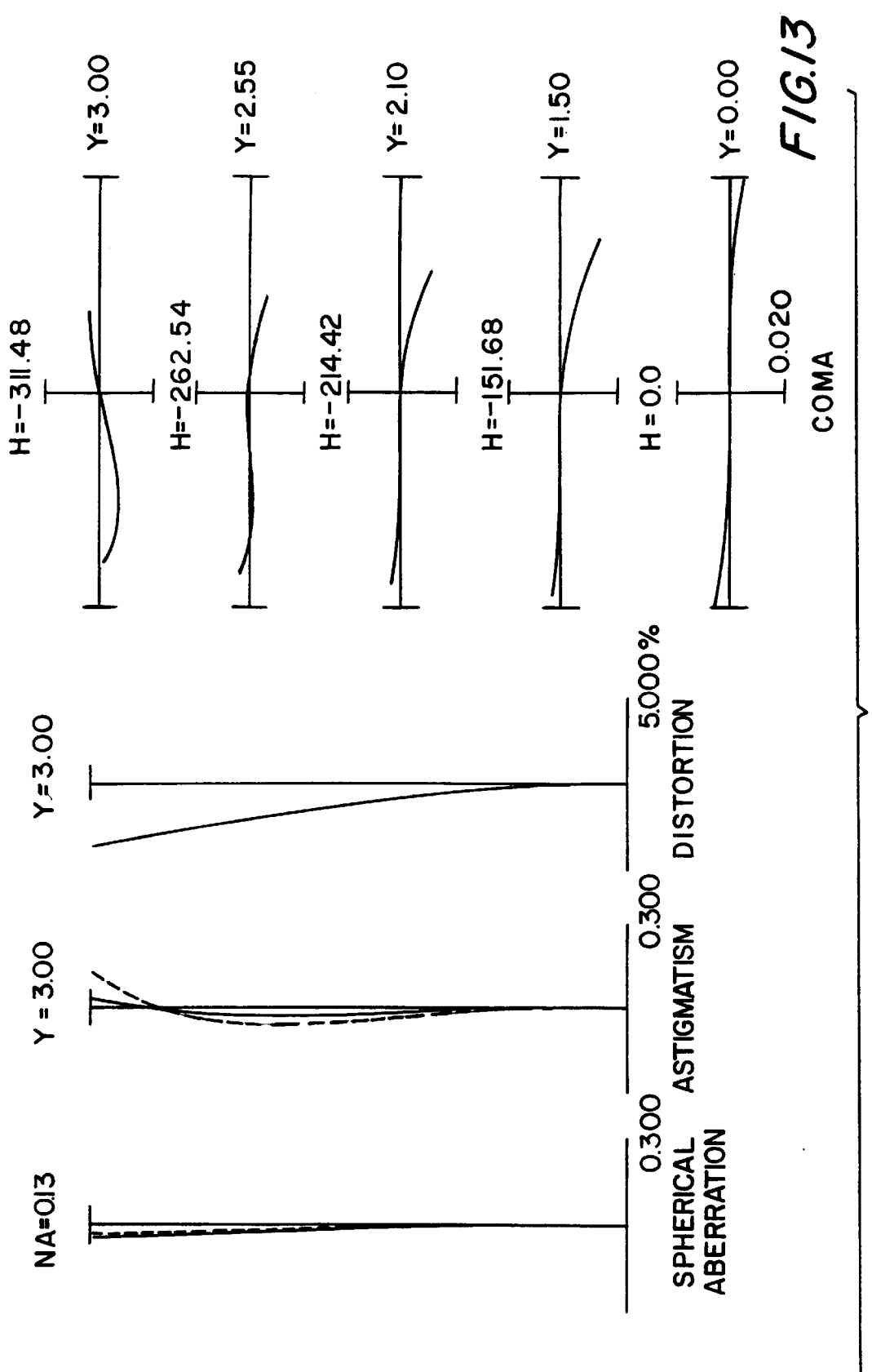
FIG. 13 shows various aberration curves of Embodiment 2 at the image magnification ratio of −0.01× at the maximum wide-angle end.
Figure 14:
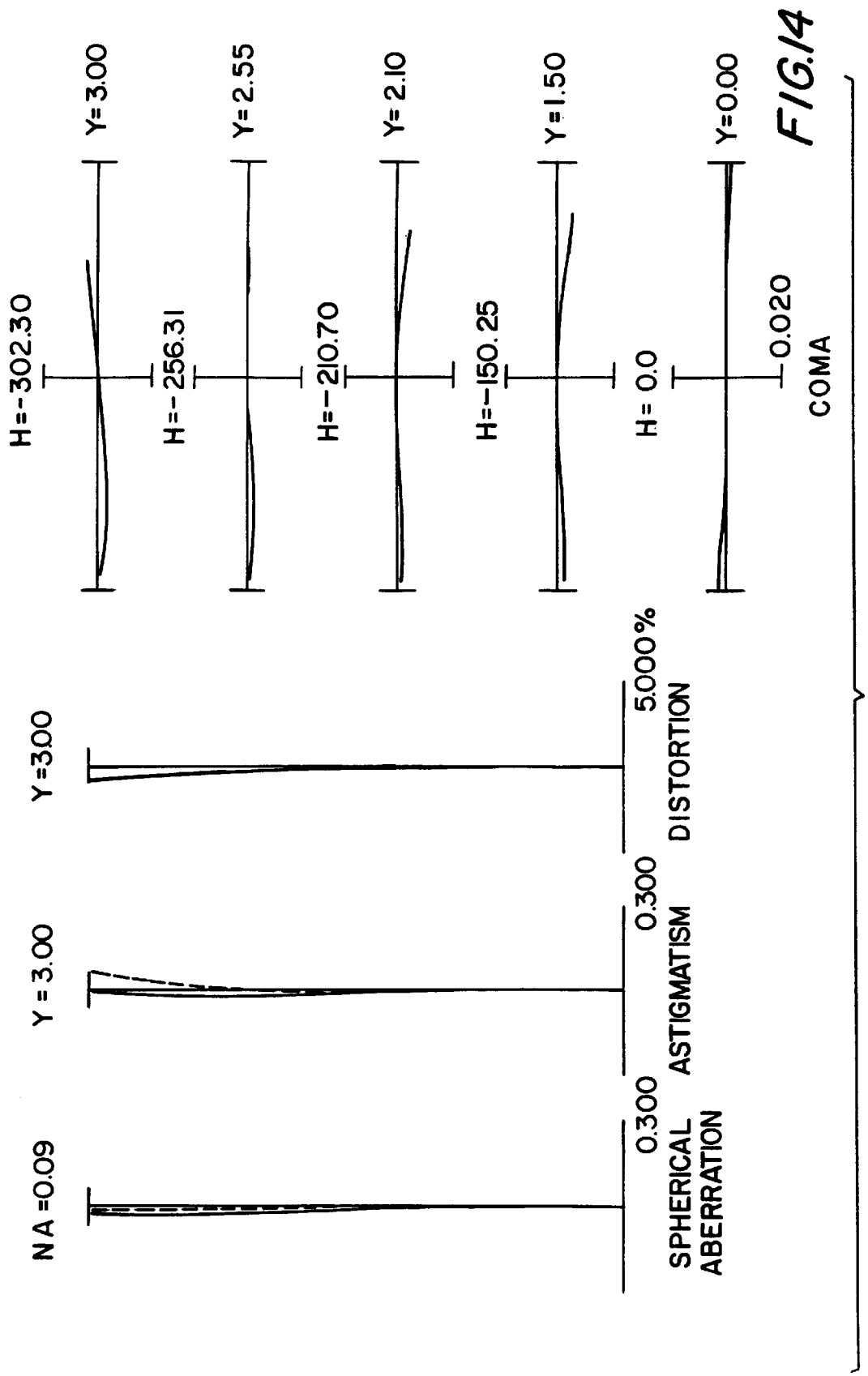
FIG. 14 shows various aberration curves of Embodiment 2 at the image magnification ratio of −0.01× at the mid focal length state.
Figure 15:
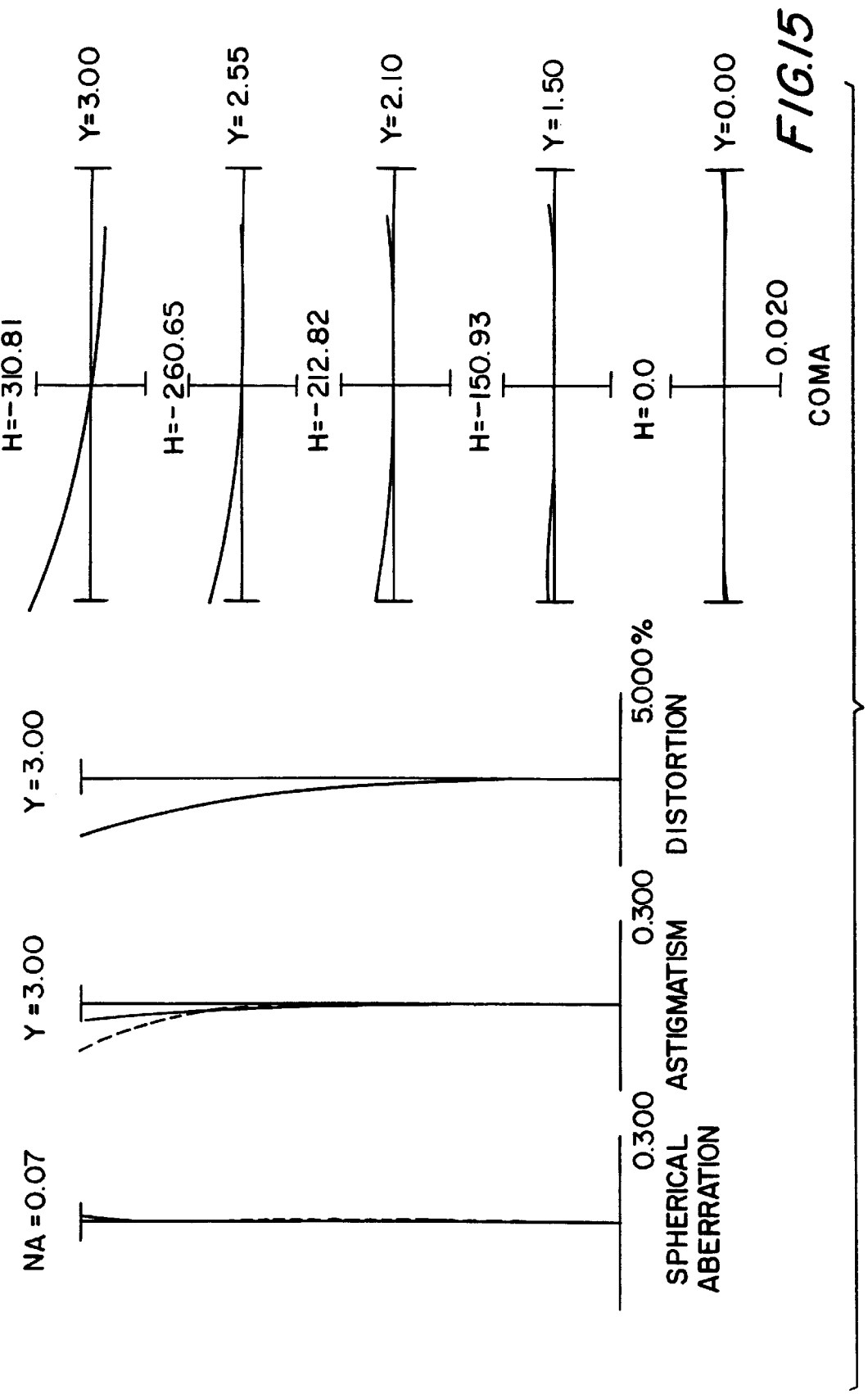
FIG. 15 shows various aberration curves of Embodiment 2 at the image magnification ratio of −0.01× at the maximum telephoto end.

FIG. 9 shows the variable magnification optical system configuration of Embodiment 2 of the present invention.

In the zoom lens system shown in FIG. 9, the first lens group G1 comprises: in order from the object side, a negative meniscus lens L11 having a convex surface facing toward the object side; and a positive meniscus lens L12 having a convex surface facing toward the object side.

The second lens group G2 comprises: in order from the object side, a positive sub-group G p. made up of:
a bi-convex lens L21 and
a positive meniscus lens L22 having a convex surface facing toward the object side; and a negative sub-group G n made up of
a bi-concave lens L23 and
a positive meniscus lens L24 having a concave surface facing toward the object side.

The third lens group G3 is made up of a bi-convex lens L3.

The aperture stop S is arranged between the first lens group G1 and the second lens group G2 and moves integrally with the second lens group G2 when the magnification is changed.

FIG. 9 shows the positional relationship of each of the lens groups in the maximum wide-angle state. When magnification is changed to the maximum telephoto state, the lens groups move on the optical axis along the zooming orbit as indicated with an arrow in FIG. 1. Note that the third lens group G3 is fixed in the optical axial direction when the magnification is changed.

Focusing from the infinitely far object to the near object is performed by moving the first lens group G1 toward the object side along the optical axis.

A float glass LO is arranged between the third lens group G3 and the image plane as a protective glass. The float glass LO is fixed in the axial direction when the magnification is changed.

In Table (2), various values of Embodiment 2 are shown. In Table (2), f is the focal length; F NO is an F number; 2ω is field angle; Bf is back focus; YO is the maximum image height; and D0 is the distance between the object and the plane at the maximum object side on the optical axis. The surface number indicates the order of the lens surface from the object side in the direction in which light progresses. The refractive index and Abbe number correspond to the values measured on the d-line ($\lambda$=587.6 nm). The surface with the curvature radius of ∞ indicates a flat surface.

TABLE 2 f = 6.15~12.00~17.50
F N0 = 3.87~5.49~7.00
2ω = 53.74~28.26~20.08°
Y0 = 3.00

| Surface No. | Radius of Curvature | Surface Separation | Refractive Index | Abbe Number | |
|---|---|---|---|---|---|
| 1 | 76.2462 | 0.800 | 1.77725 | 49.62 | |
| 2 | 6.6277 | 0.950 | | | |
| 3 | 7.1449 | 1.500 | 1.84666 | 23.83 | |
| 4 | 10.7265 | (d4 = variable) | | | |
| 5 | ∞ | 1.000 | | | (Aperture Stop S) |
| 6 | 4.5160 | 1.300 | 1.61560 | 58.44 | |
| 7 | −27.5940 | 0.100 | | | |
| 8 | 4.8289 | 1.300 | 1.62041 | 60.35 | |
| 9 | 20.0406 | 0.450 | | | |
| 10 | −7.1739 | 0.800 | 1.79504 | 28.56 | |
| 11 | 3.1393 | 1.000 | | | |
| 12 | −49.2619 | 1.300 | 1.60342 | 38.02 | |
| 13 | −8.1642 | (d13 = variable) | | | |
| 14 | 20.8166 | 1.500 | 1.77250 | 49.61 | |
| 15 | −12.8199 | 0.500 | | | |
| 16 | ∞ | 3.050 | 1.51680 | 64.20 | (Protection Glass L0) |
| 17 | ∞ | (Bf) | | | |

(Variable Lens Separation Values during Zooming in Motion)

| f   | 6.1500  | 12.0000 | 17.5000 |
|-----|---------|---------|---------|
| d4  | 11.0410 | 3.1224  | 0.5000  |
| d13 | 1.9020  | 7.3444  | 12.4500 |
| Bf  | 1.0000  | 1.0000  | 1.0000  |

(Moving Amount δ1 of a First Lens Group G1 for focusing at the magnification 0.01×)

| Focal Length f   | 6.1500   | 12.0000   | 17.5000   |
|------------------|----------|-----------|-----------|
| D0               | 597.7543 | 1181.7565 | 1732.7642 |
| Moving Amount δ1 | 0.4372   | 0.2240    | 0.1536    |

Note that the amount moved toward the object side is regarded as a positive movement.

(Values Corresponding to the Condition)
f3=10.474
f1=−16.397
Do=6.250
f2=9.641
β2W=−0.593
β2T=−1.685
M2=10.548
fn=−3.805
(1)f3/|f1|=0.639
(2)Do/f2=0.648
(3)β2T/β2W=0.999
(4)f2/|f1|=0.588
(5)M2/|fn|=2.772

FIGS. 10 through 15 are aberration curves on the d-line (λ=587.6) in Embodiment 2.

In each of the aberration curves of FIGS. 10–15, F No is an F number, NA is numerical aperture, Y is the image height, A is angle of incidence and H is the object height.

In an aberration curve showing astigmatism, a solid line shows a sagittal image plane and a dotted line shows a meridional image plane. In an aberration curve showing spherical aberration, a dotted line shows a sine condition.

As is apparent from each of the aberration curves, this embodiment corrects various aberrations excellently in each of the objective distance states and focal length states, demonstrating an excellent imaging performance.

A compact zoom lens system in accordance with Embodiments 1 and 2, as described above, permits an exit pupil to be kept far apart from the image plane.

Embodiment 3

Figure 16:
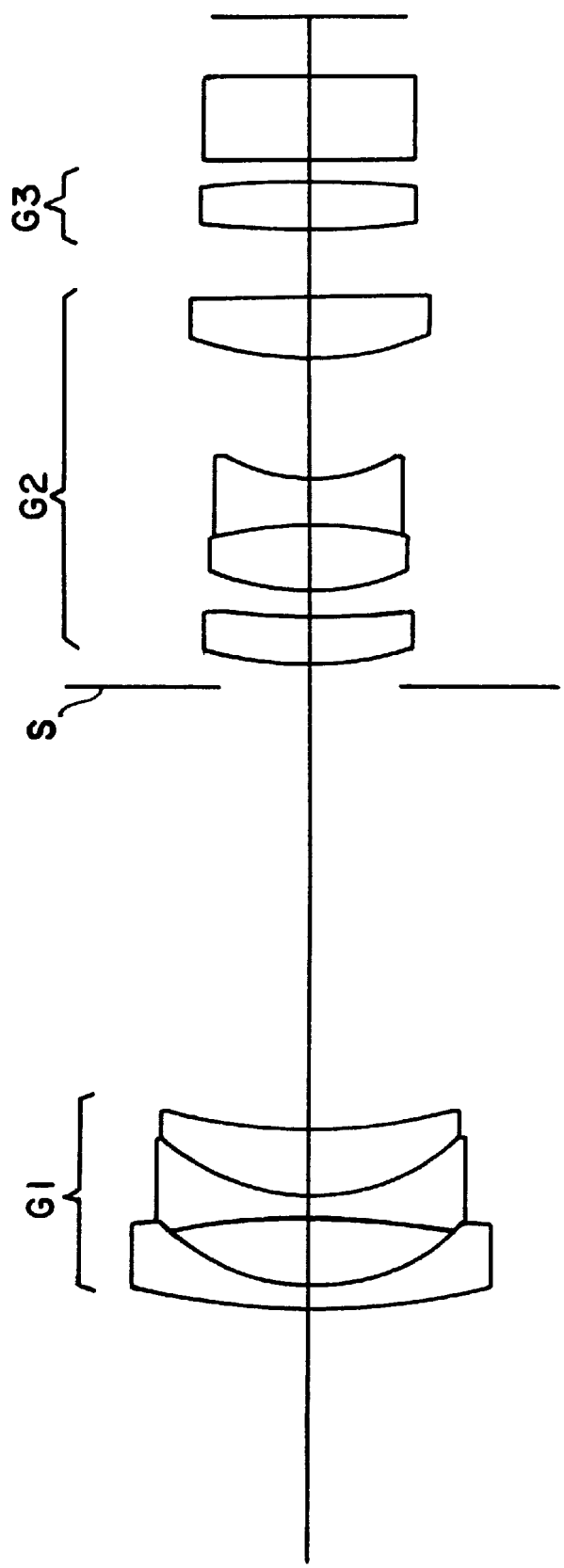
FIG. 16 is a configuration showing a variable magnification optical system of Embodiment 3 of the present invention.

FIG. 16 is a configuration showing the variable magnification optical system of Embodiment 3 of the present invention.

In the zoom lens shown in FIG. 16, the first lens group G1 comprises: in order from the object side, a negative meniscus lens having a convex surface facing toward the object side;

a cemented lens made up of a bi-concave lens and a positive meniscus lens having a convex surface facing toward the object side.

The second lens group G2 comprises: in order from the object side, a positive meniscus lens having a convex surface facing toward the object side and a cemented lens made up of a bi-convex lens and a bi-concave lens; and a positive meniscus lens having a convex aspherical surface facing toward the object side.

The third lens group G3 is made up of a bi-convex lens having an aspherical surface facing toward the image side.

Aperture stop S is formed near the second lens group G2 between the first lens group G1 and the second lens group G2. Aperture stop S moves integrally with the second lens group G2 when the magnification is changed.

FIG. 16 is a lens layout at the wide angle end. When magnification is changed, the first lens group G1 moves first to the image side and then, moves toward the object side. The second lens group G2 moves toward the object side. The third lens group G3 is fixed.

In the zoom lens system of Embodiment 3, focusing from the far object to the near object is performed by moving the first lens group G1 toward the object side.

In Table (3), f is the focal length; BF is the back focal length; F NO is an F number; 2ω is field angle. In the various lens values in Table (3), the first column shows the lens surface number; r in the second column shows the radius of curvature of the lens surface; d in the third column shows the lens surface separation; ν in the fourth column shows Abbe number; n in the fifth column shows the refractive index on d-line (λ=587.6 nm).

TABLE 3

(Overall Lens Values)
f = 1.000~1.714~3.000
Bf = 0.386
F NO = 2.313~2.778~3.601
2ω = 62.30~36.84~20.90°

(Lens Value)

| Surface NO. | r       | d              | ν     | n       |             |
|-------------|---------|----------------|-------|---------|-------------|
| 1           | 4.3774  | 0.1857         | 35.72 | 1.90265 |             |
| 2           | 1.4641  | 0.4286         |       |         |             |
| 3           | −5.5518 | 0.1571         | 54.55 | 1.51454 |             |
| 4           | 1.4586  | 0.4500         | 23.01 | 1.86074 |             |
| 5           | 4.2009  | (d5 = variable)|       |         |             |
| 6           | ∞       | 0.1429         |       |         | Aperture Stop S |
| 7           | 2.1779  | 0.3357         | 35.72 | 1.90265 |             |
| 8           | 69.3972 | 0.1571         |       |         |             |
| 9           | 1.6061  | 0.4357         | 41.96 | 1.66755 |             |
| 10          | −2.1400 | 0.3214         | 23.01 | 1.86074 |             |
| 11          | 1.2866  | 0.8000         |       |         |             |
| 12*         | 2.0580  | 0.3929         | 45.37 | 1.79668 |             |
| 13          | 23.2383 | (d13 = variable)|      |         |             |
| 14          | 10.5637 | 0.3071         | 45.37 | 1.79668 |             |
| 15*         | −8.8275 | 0.1429         |       |         |             |
| 16          | ∞       | 0.5471         | 64.10 | 1.51680 |             |
| 17          | ∞       | (Bf)           |       |         |             |

(Aspherical Surface Data)

| | r | K | C4 |
|---|---|---|---|
| 12th Surface | 2.0580 | 1.00000 | −2.44429 × $10^{-2}$ |
| | C6 | C8 | C10 |
| | +1.37675 × $10^{-3}$ | −9.74011 × $10^{-4}$ | 0.00000 |
| | r | K | C4 |
| 15th Surface | −8.8275 | 1.00000 | +6.42818 × $10^{-2}$ |
| | C6 | C8 | C10 |
| | −3.89958 × $10^{-3}$ | +1.21589 × $10^{-2}$ | 0.00000 |

| (Variable Lens Separation Values During Zooming Motion) | | | |
|---|---|---|---|
| | Wide-angle End | Med Focal Length | Telephoto End |
| f | 1.00000 | 1.71428 | 3.00000 |
| d5 | 2.97523 | 1.29429 | 0.28571 |
| d13 | 0.45285 | 1.37786 | 3.04289 |
| Bf | 0.386 | 0.386 | 0.386 |

(Values Corresponding to the Condition)
(6)f2/|f1|=1.089
(7)f3/fw=6.079
(8)ν1=35.72
(9)n3−n2=0.34620
(10)(rR+rF)/(rR−rF)=1.19
(11)fP/f2=1.23
(12)hR/fw=0.43
(13)f2/fw=2.29
(14)f3/f2=2.66

Figure 17:
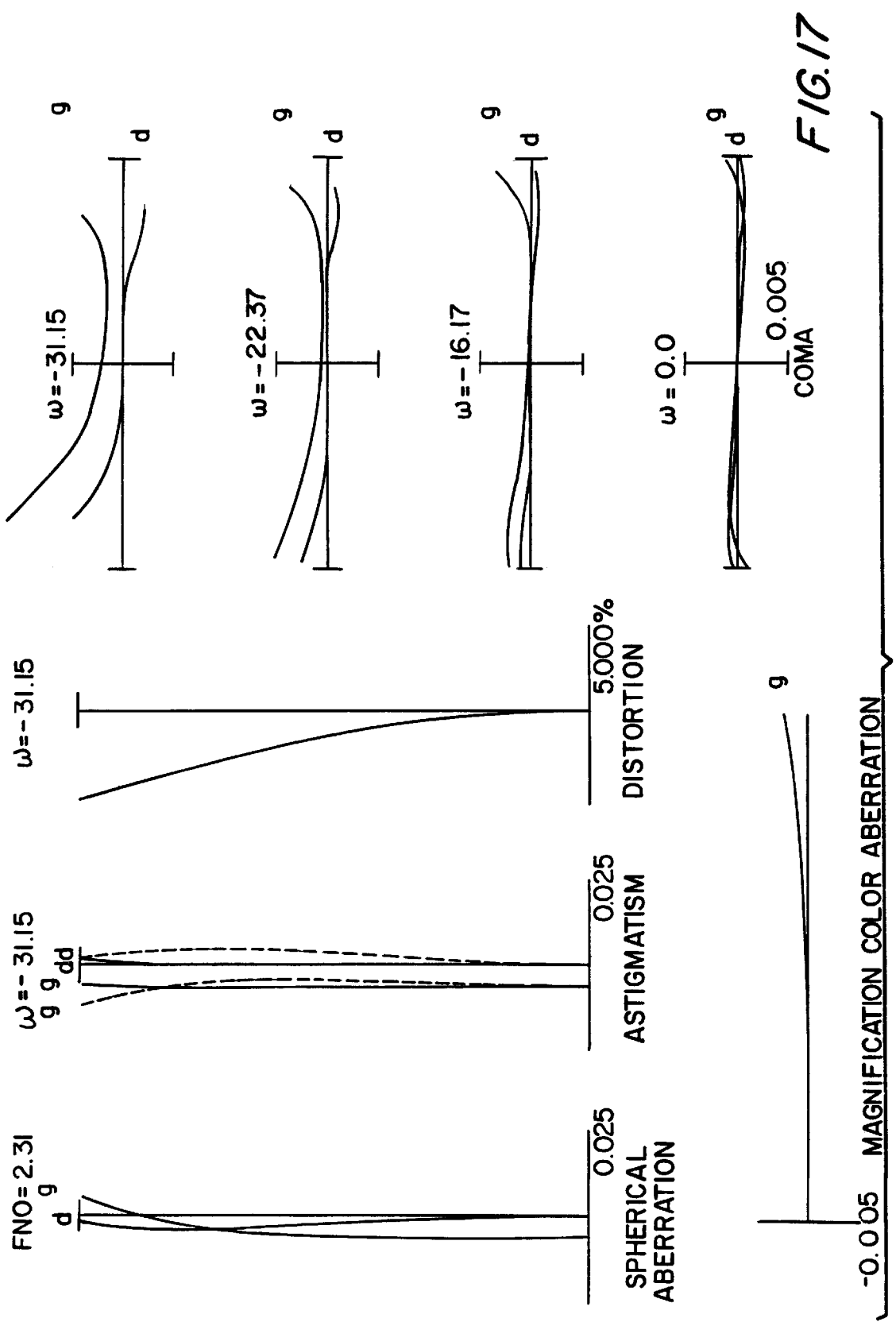
FIG. 17 shows various aberration curves of Embodiment 3 at the wide-angle end state in the infinitely far focusing state.
Figure 18:
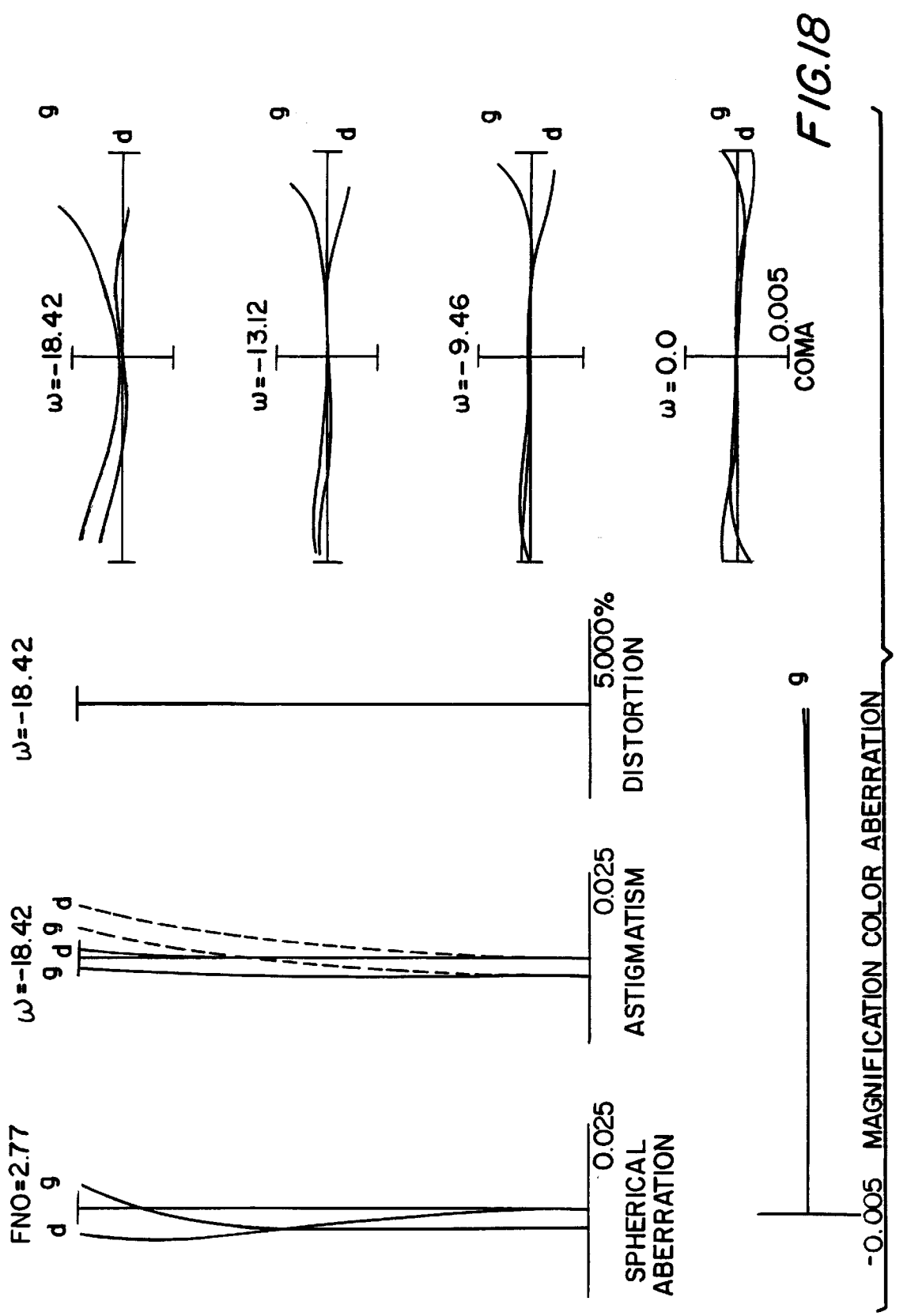
FIG. 18 shows various aberration curves of Embodiment 3 at the mid focal length state in the infinitely far focusing state.
Figure 19:
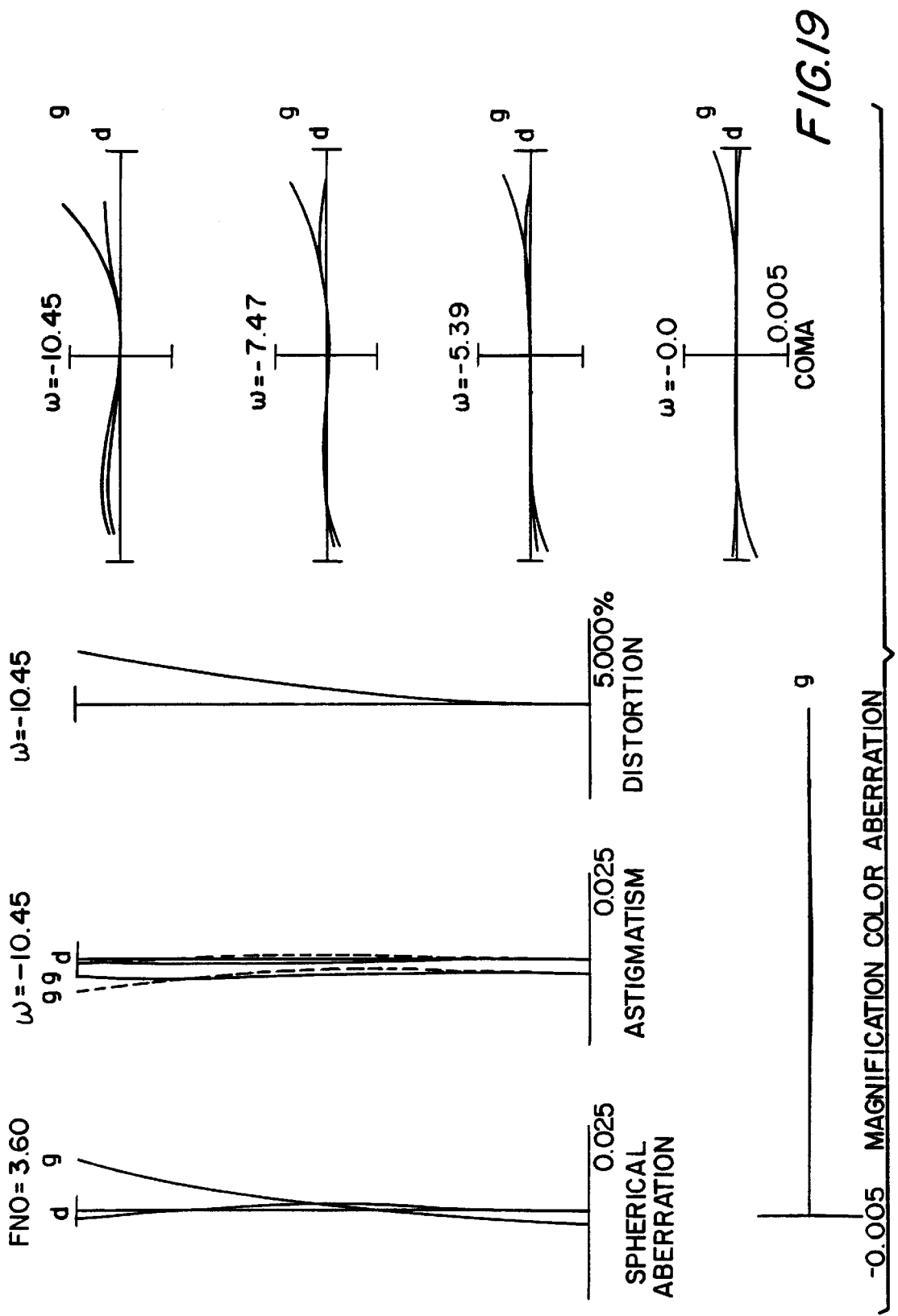
FIG. 19 shows various aberration curves of Embodiment 3 at the maximum telephoto end state in the infinitely far focusing state.

FIGS. 17 through 19 are aberration curves on the d-line ($\lambda$=587.6) for Embodiment 3.

In each of the aberration curves of FIGS. 17–19, F No is an F number; ω is field angle; d is a d-line ($\lambda$=587.6 nm); g is a g-line ($\lambda$=435.8 nm). In an aberration curve showing astigmatism, a solid line shows a sagittal field plane; a dotted line shows a meridional field plane.

As is apparent from each of the aberration curves, this embodiment corrects various aberrations excellently in each of focal length states, demonstrating an excellent imaging performance.

Embodiment 4

Figure 20:
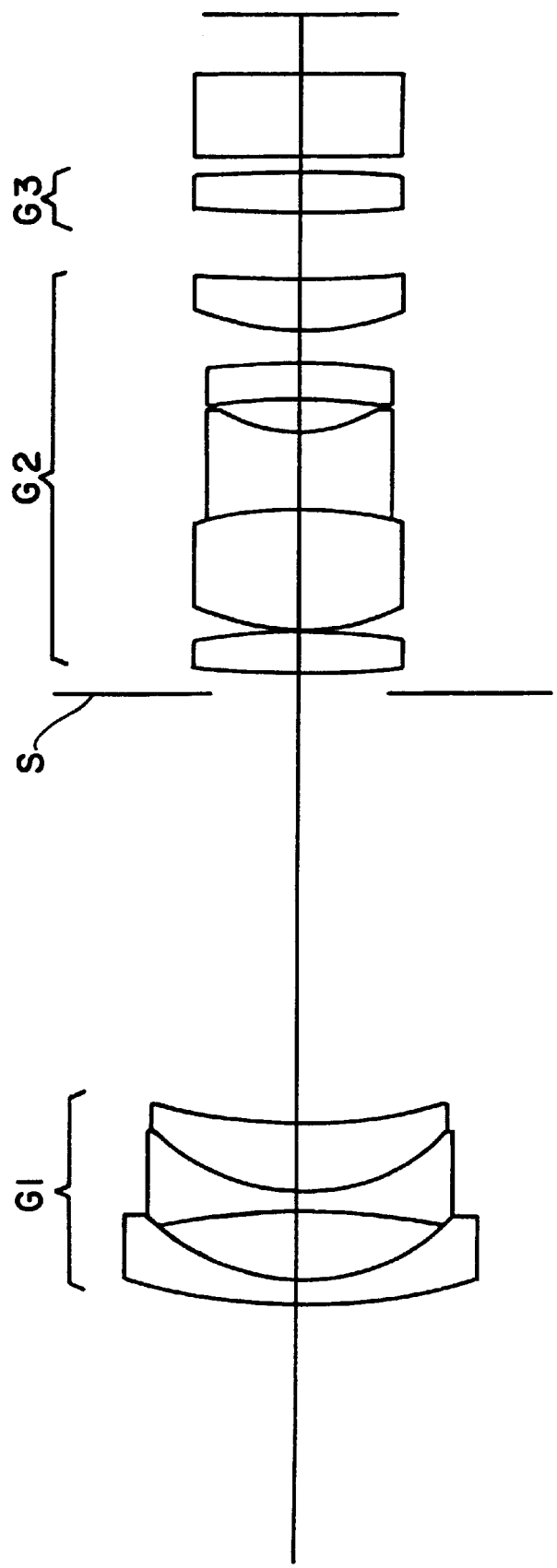
FIG. 20 is a configuration showing a variable magnification optical system of Embodiment 4 of the present invention.

FIG. 20 is a configuration showing the magnification optical system of Embodiment 4 of the present invention.

In the zoom lens system shown in FIG. 20, the first lens group G1 comprises: in order from the object side,

- a negative meniscus lens having a convex surface facing toward the object side; and a cemented lens made up of
  - a bi-convex lens and
  - a positive meniscus lens having a convex surface facing toward the object side.

The second lens group G2 comprises: in order from the object side,

- a bi-convex lens,
- a cemented lens which is made up of a bi-convex lens and a bi-concave lens;
- a positive meniscus lens having a concave surface facing toward the object side; and
- a positive meniscus lens having a convex surface facing toward the object side.

The third lens group G3 is made up of a bi-convex lens having an aspherical surface facing toward the image side.

The aperture stop S is arranged near the second lens group G2 between the first lens group G1 and the second lens group G2. The aperture stop S moves integrally with the second lens group G2 when the magnification is changed.

FIG. 20 shows the lens layout at the wide-angle end. When the magnification is changed to the maximum telephoto state, the first lens group G1 first moves to the image side, then moves to the object side. The second lens group G2 moves toward the object side. The third lens group G3 is fixed.

In the zoom lens system of Embodiment 4, when focusing is performed from the far object to the near object, the first lens group G1 is moved toward the object side.

In Table (4), various values of Embodiment 4 are shown, wherein; f is the focal length; Bf is back focus; F NO is an F number and 2ω is the field angle. In the various lens values in Table (4), the first column shows the lens surface number; r in the second column shows the radius of curvature of the lens surface; d in the third column shows the lens surface separation; ν in the fourth column shows Abbe number; n in the fifth column shows the refractive index on the d-line ($\lambda$=587.6 nm).

TABLE 4

(Overall Lens Values)
f = 1.000~1.667~2.833
Bf = 0.371
F NO = 2.315~2.784~3.596
2ω = 63.62~38.55~22.47°

| (Lens Value) Surface NO. | r | d | ν | n |
|---|---|---|---|---|
| 1 | 5.5971 | 0.1805 | 33.27 | 1.80610 |
| 2 | 1.3848 | 0.3888 | | |
| 3 | −7.6324 | 0.1528 | 64.20 | 1.51680 |
| 4 | 1.3383 | 0.4444 | 23.78 | 1.84666 |
| 5 | 3.9968 | (d5 = variable) | | |
| 6 | ∞ | 0.1389 | | Aperture Stop S |
| 7 | 4.9313 | 0.2777 | 42.97 | 1.83500 |
| 8 | −8.2830 | 0.0208 | | |
| 9 | 1.4933 | 0.8193 | 47.19 | 1.67003 |
| 10 | −2.1814 | 0.5277 | 23.78 | 1.84666 |
| 11 | 1.1523 | 0.1875 | | |
| 12 | −8.3879 | 0.2638 | 32.17 | 1.67270 |
| 13 | −3.5878 | 0.2222 | | |
| 14 | 1.8812 | 0.3472 | 40.18 | 1.70200 |
| 15 | 26.2269 | (d15 = variable) | | |
| 16 | 10.0165 | 0.2638 | 55.18 | 1.66547 |
| 17* | −5.4457 | 0.1389 | | |
| 18 | ∞ | 0.5319 | 64.20 | 1.51680 |
| 19 | ∞ | (Bf) | | |

| (Aspherical Surface Data) | | | |
|---|---|---|---|
| | r | K | C4 |
| 17th Surface | −5.4457 | 1.00000 | +8.52229 × 10$^{-2}$ |
| | C6 | C8 | C10 |
| | −2.09000 × 10$^{-2}$ | +4.81258 × 10$^{-4}$ | 0.00000 |

| (Variable Lens Separation Values during Zooming in Motion) | | | |
|---|---|---|---|
| | Wide-angle End | Med. Focal Length | Telephoto End |
| f | 1.00000 | 1.66666 | 2.83333 |
| d5 | 2.91504 | 1.37073 | 0.41689 |
| d13 | 0.41638 | 1.26928 | 2.76185 |
| Bf | 0.371 | 0.371 | 0.371 |

(Values Corresponding to the Condition)
(6)f2/|f1|=1.060
(7)f3/fw=5.338
(8)ν1=33.27
(9)n3−n2=0.32986
(10)(rR+rF)/(rR−rF)=1.15
(11)fP/f2=1.29
(12)hR/fw=0.43
(13)f2/fw=2.22
(14)f3/f2=2.40

Figure 21:
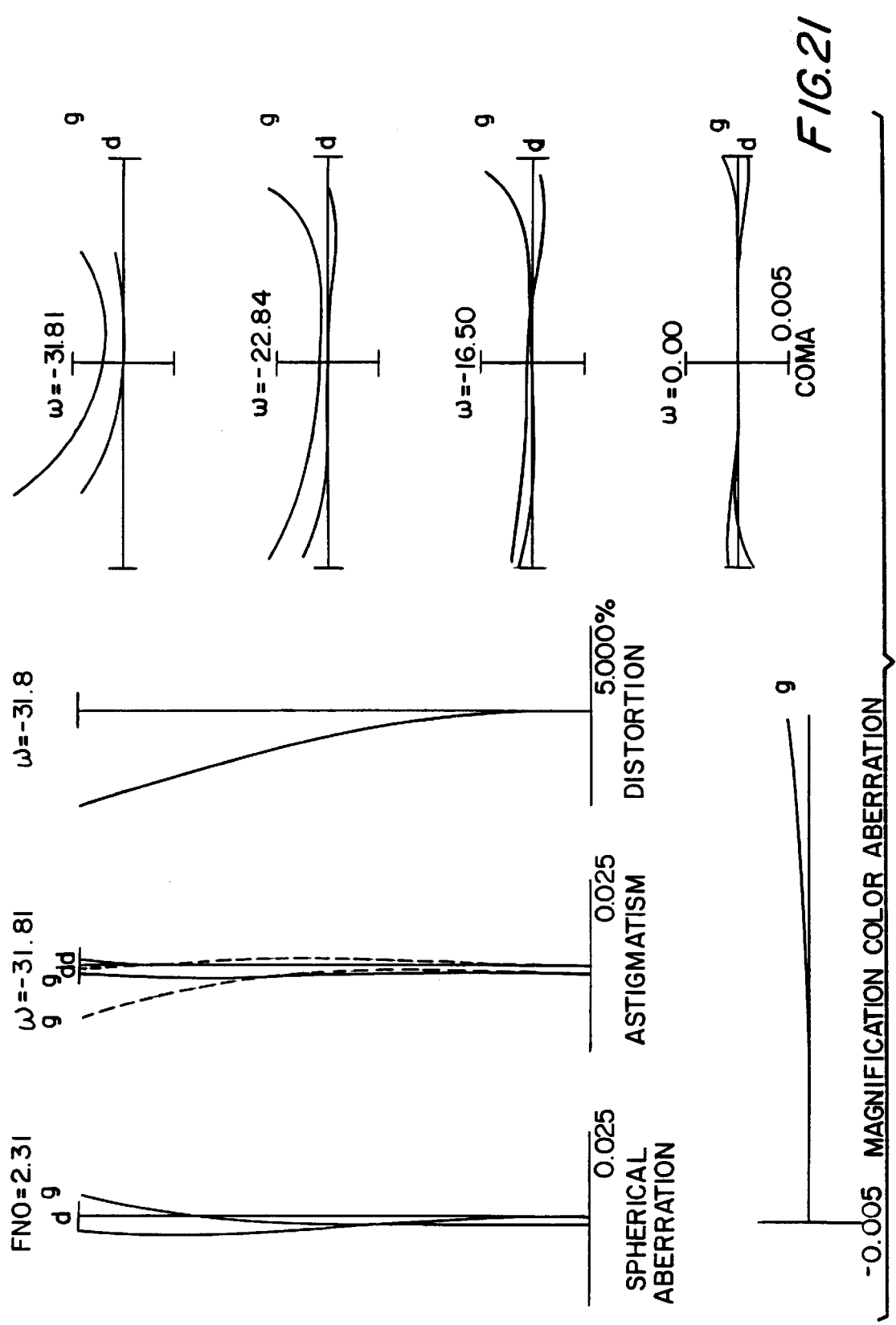
FIG. 21 shows various aberration curves of Embodiment 4 at the maximum wide-angle end state.
Figure 22:
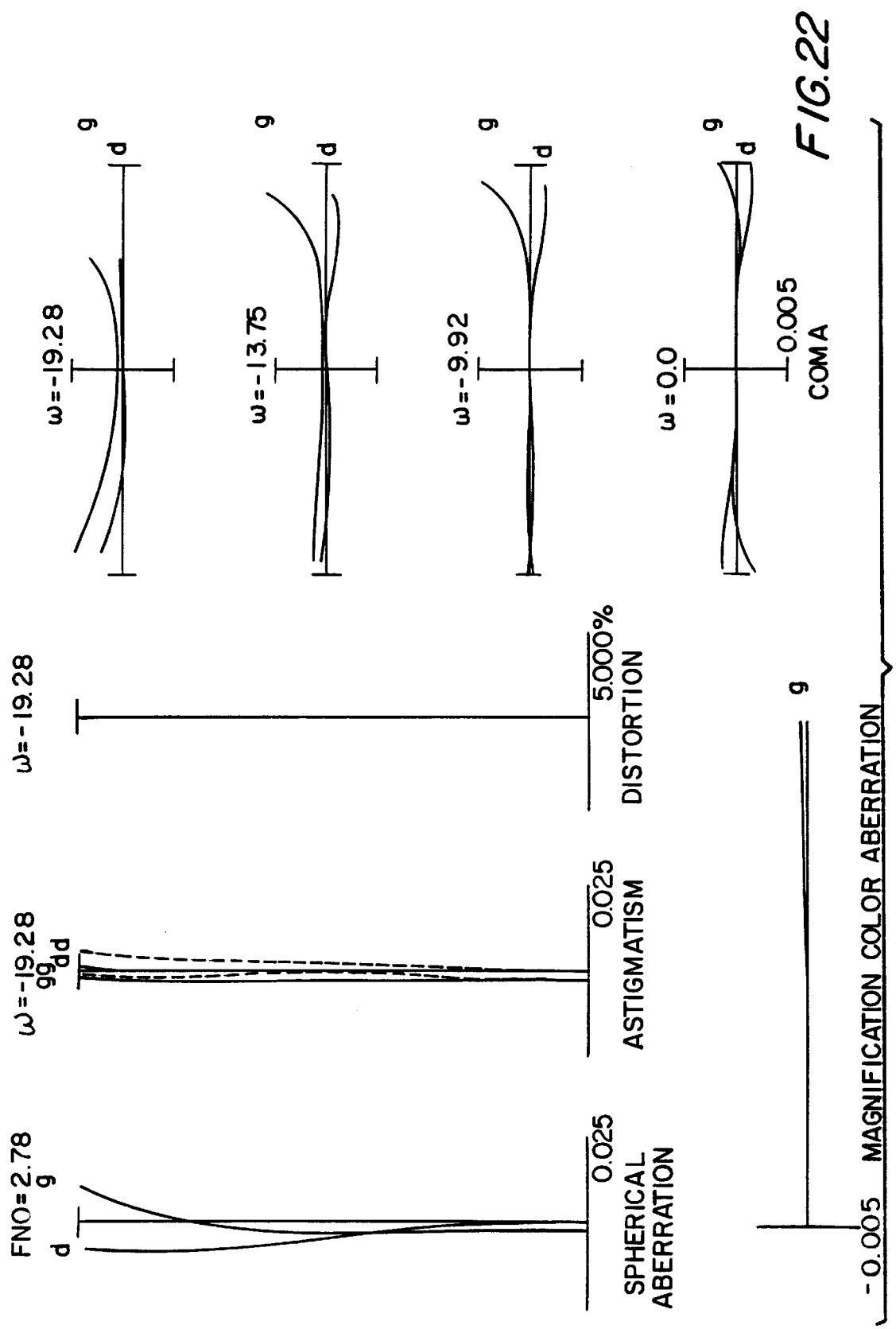
FIG. 22 shows various aberration curves of Embodiment 4 at the mid focal length state.
Figure 23:
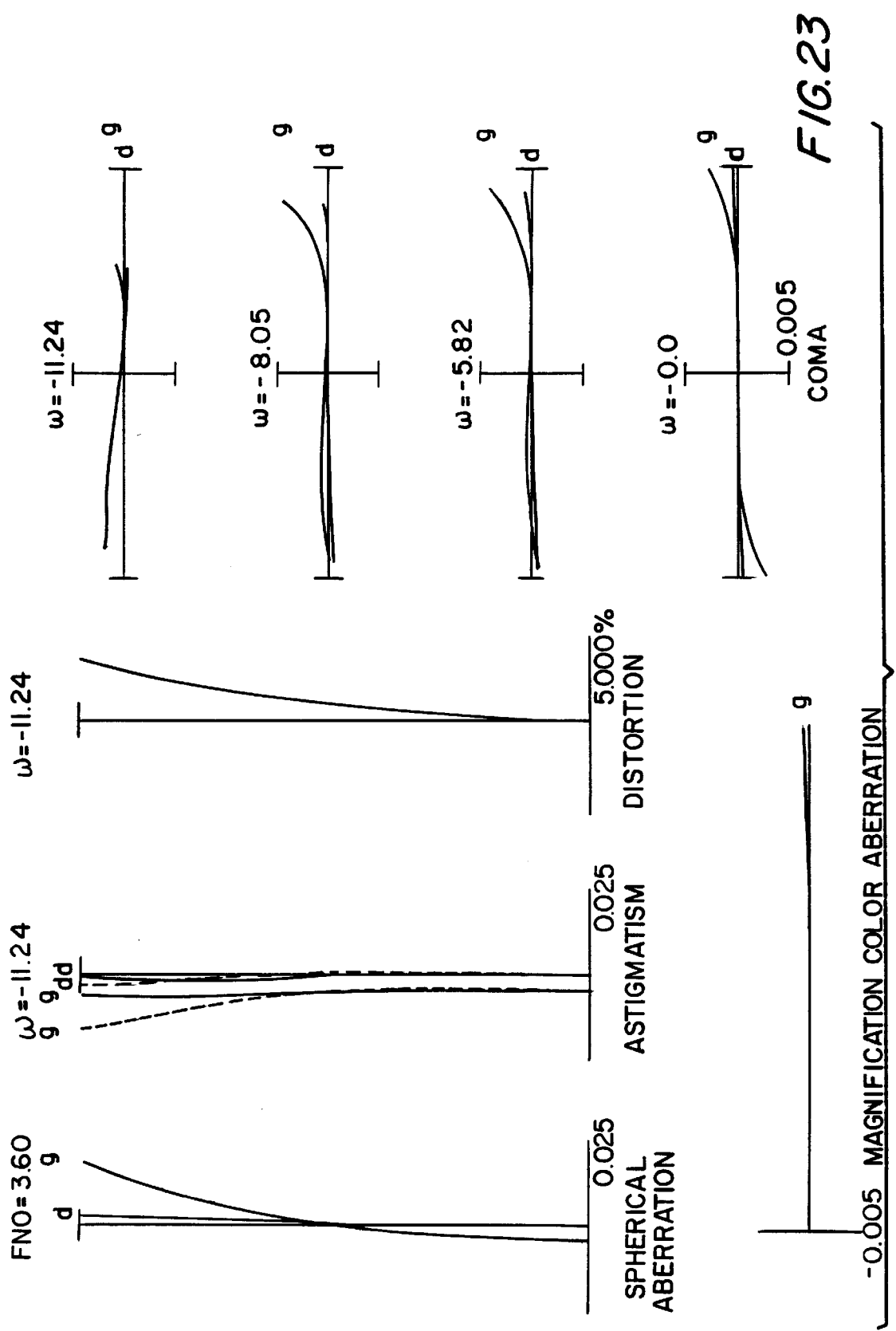
FIG. 23 shows various aberration curves of Embodiment 4 at the maximum telephoto end state.

In each of the aberration curves of FIGS. 21–23; F No is an F number; ω is field angle; d is a d-line (λ=587.6 nm); g is the g-line (λ=435.8 nm). In an aberration curve showing astigmatism, a solid line shows a sagittal image plane and a dotted line shows a meridional image plane.

As is apparent from each of the aberration curves, this embodiment corrects various aberrations excellently in each of focal length states, demonstrating an excellent imaging performance.

Embodiment 5

Figure 24:
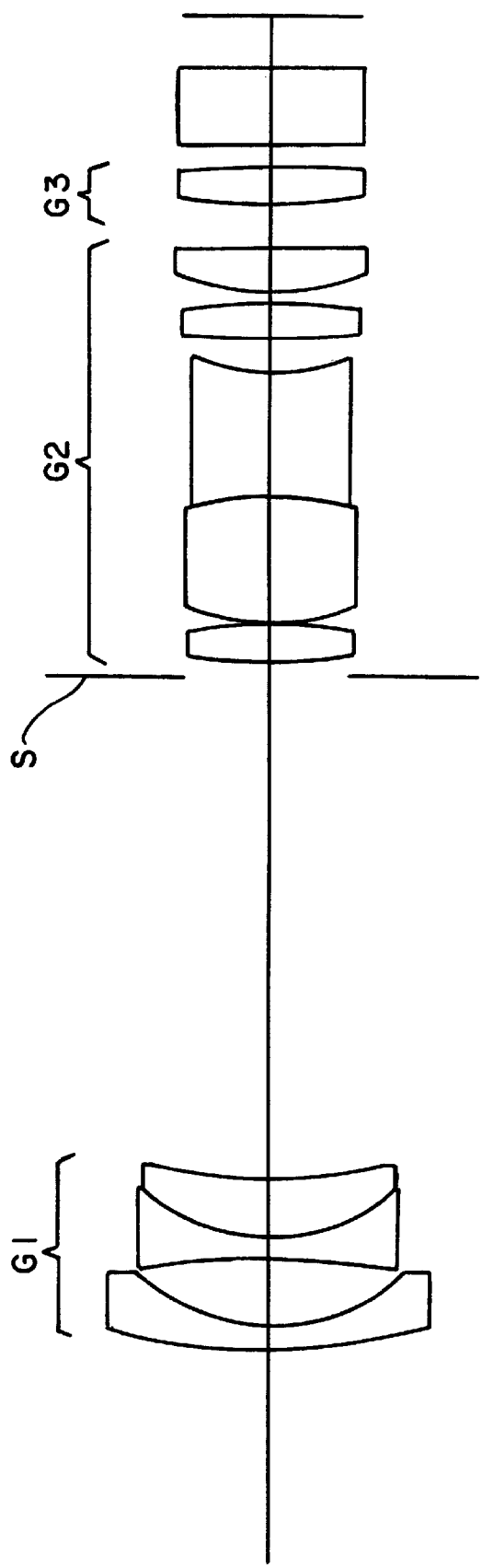
FIG. 24 is a lens layout showing a zoom lens of Embodiment 5 of the present invention.

FIG. 24 shows the lay out of the zoom lens system in accordance with Embodiment 5 of the present invention. In a zoom lens system shown in FIG. 24, the first lens group G1 comprises:

a negative meniscus lens having a convex surface facing toward the object side; and a cemented lens, which is made up of a bi-concave lens and a positive meniscus lens having a convex surface facing toward the object side.

The second lens group G2 comprises: in order from the object side, a bi-convex lens, a cemented lens, which is made up of a bi-convex lens and a bi-concave lens;

a bi-convex lens; and a positive meniscus lens having a convex surface facing toward the object side.

The third lens group G3 is made up of a bi-convex lens having an aspherical surface facing toward the image side.

The aperture stop S is arranged near the second lens group G2 between the first lens group G1 and the second lens group G2. The aperture stop S moves integrally with the second lens group G2 when magnification is changed.

FIG. 24 shows a lens layout at the wide-angle end. When the magnification is changed to the maximum telephoto state, the first lens group G1 first moves to the image side, then moves to the object side. The second lens group G2 moves toward the object side. The third lens group G3 is fixed.

In the zoom lens system of Embodiment 5, when focusing is performed from the far object to the near object, the first lens group G1 is moved toward the object side.

In Table (5), various values of Embodiment 5 are shown, wherein; f is the focal length; Bf is back focus; F NO is an F number; 2ω is field angle. In the various lens values in Table (5), the first column shows the lens surface number; r in the second column shows the radius of curvature of the lens surface; d in the third column shows the lens surface separation; ν in the fourth column shows Abbe number; n in the fifth column shows the refractive index on the d-line (λ=587.6 nm).

TABLE 5

(Overall Lens Values)
f = 1.000~1.770~2.850
Bf = 0.389
F NO = 2.729~3.282~4.049
2ω = 66.11~38.13~23.59°

(Lens Value)

| Surface NO. | r | d | ν | n |
|---|---|---|---|---|
| 1 | 4.48942 | 0.1947 | 33.27 | 1.80610 |
| 2 | 1.5708 | 0.5133 | | |
| 3 | −7.3822 | 0.1770 | 64.20 | 1.51680 |

TABLE 5-continued (Overall Lens Values)
f = 1.000~1.770~2.850
Bf = 0.389
F NO = 2.729~3.282~4.049
2ω = 66.11~38.13~23.59°

(Lens Value)

| Surface NO. | r | d | ν | n |
|---|---|---|---|---|
| 4 | 1.5361 | 0.4602 | 23.78 | 1.84666 |
| 5 | 4.0004 | (d5 = variable) | | |
| 6 | ∞ | 0.1416 | | Aperture Stop S |
| 7 | 5.7721 | 0.2832 | 42.97 | 1.83500 |
| 8 | −12.0993 | 0.0177 | | |
| 9 | 1.9667 | 0.9912 | 47.19 | 1.67003 |
| 10 | −2.5205 | 0.9735 | 23.78 | 1.84666 |
| 11 | 1.5044 | 0.2655 | | |
| 12 | 15.9309 | 0.2832 | 37.99 | 1.72342 |
| 13 | −6.5485 | 0.0885 | | |
| 14 | 2.0489 | 0.3540 | 40.18 | 1.70200 |
| 15 | 15.5822 | (d15 = variable) | | |
| 16 | 13.5012 | 0.2655 | 53.31 | 1.69350 |
| 17* | −8.1275 | 0.1770 | | |
| 18 | ∞ | 0.5841 | 64.20 | 1.51680 |
| 19 | ∞ | (Bf) | | |

(Aspherical Surface Data)

| | r | K | C4 |
|---|---|---|---|
| 17th Surface | −8.1275 | 100.000 | +8.49548 × 10⁻² |
| | C6 | C8 | C10 |
| | +1.43943 × 10⁻² | −2.44002 × 10⁻³ | +9.25524 × 10⁻² |

(Variable Lens Separation Values during Zooming in Motion)

| | Wide-angle End | Med. Focal Length | Telephoto End |
|---|---|---|---|
| f | 1.00000 | 1.76992 | 2.84957 |
| d5 | 3.98366 | 1.76458 | 0.67254 |
| d13 | 0.35397 | 1.30802 | 2.64587 |
| Bf | 0.389 | 0.389 | 0.389 |

(Values Corresponding to the Condition)
(6)f2/|f1|=1.069
(7)f3/fw=7.353
(8)ν1=33.27
(9)n3−n2=0.32986
(10)(rR+rF)/(rR−rF)=1.30
(11)fP/f2=1.32
(12)hR/fw=0.46
(13)f2/fw=2.51
(14)f3/f2=2.92

Figure 25:
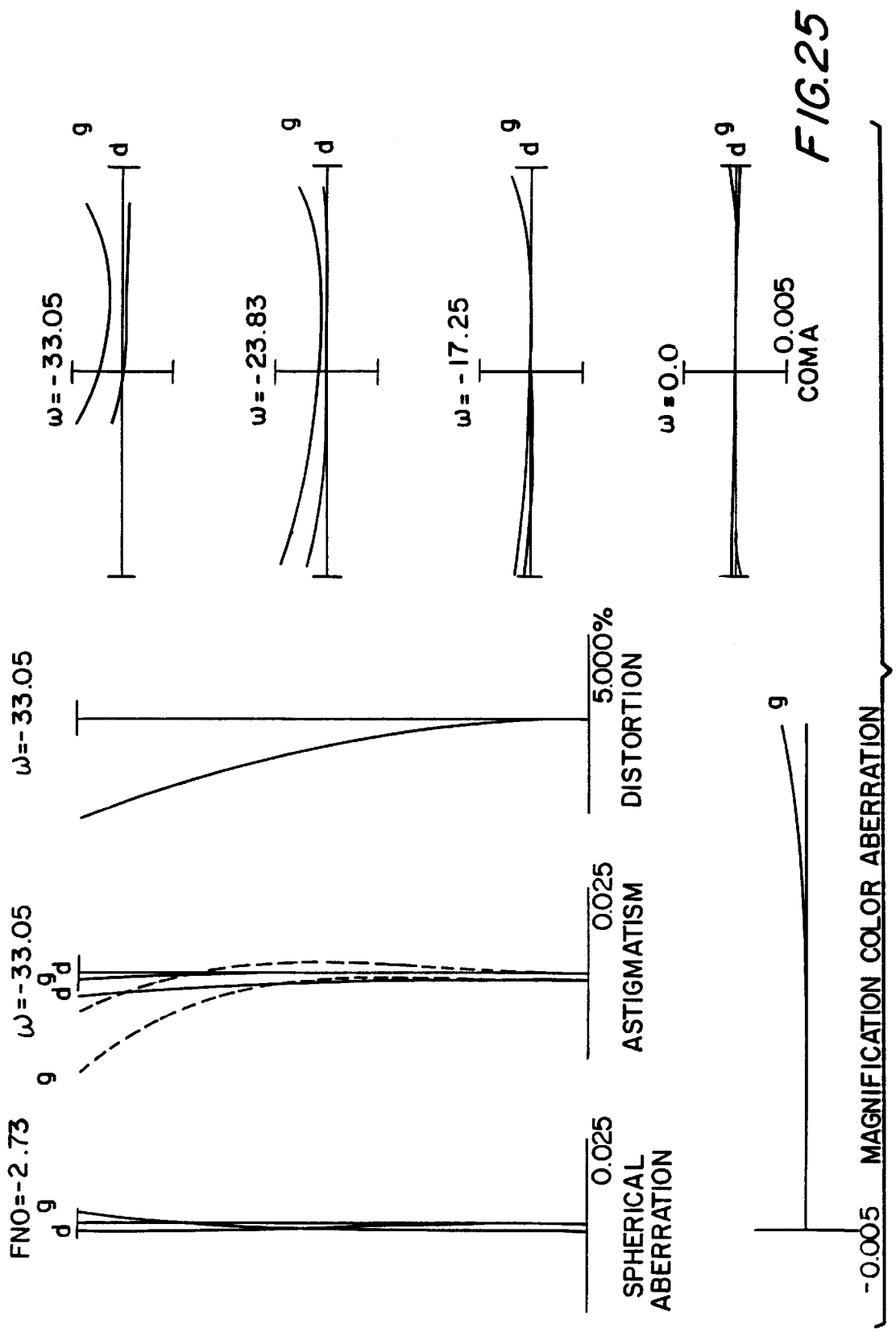
FIG. 25 shows various aberration curves of Embodiment 5 at the maximum wide-angle end state.
Figure 26:
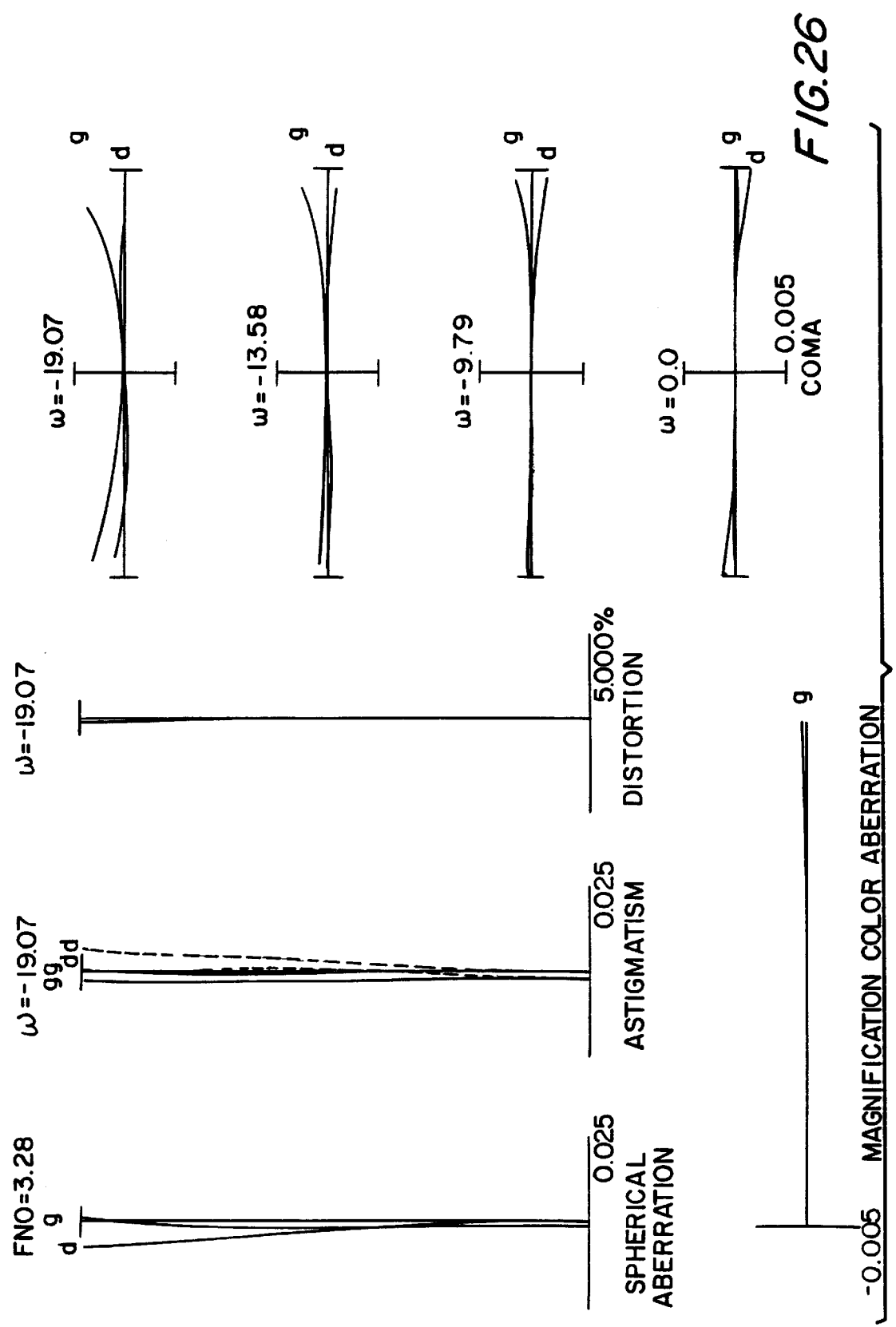
FIG. 26 shows various aberration curves of Embodiment 5 at the mid focal length state.

FIG. 25 shows various aberration curves of Embodiment 5 in the maximum wide-angle state. FIG. 26 shows various aberration curves in the mid focal length state and FIG. 27 shows various aberration curves in the maximum telephoto state.

Figure 27:
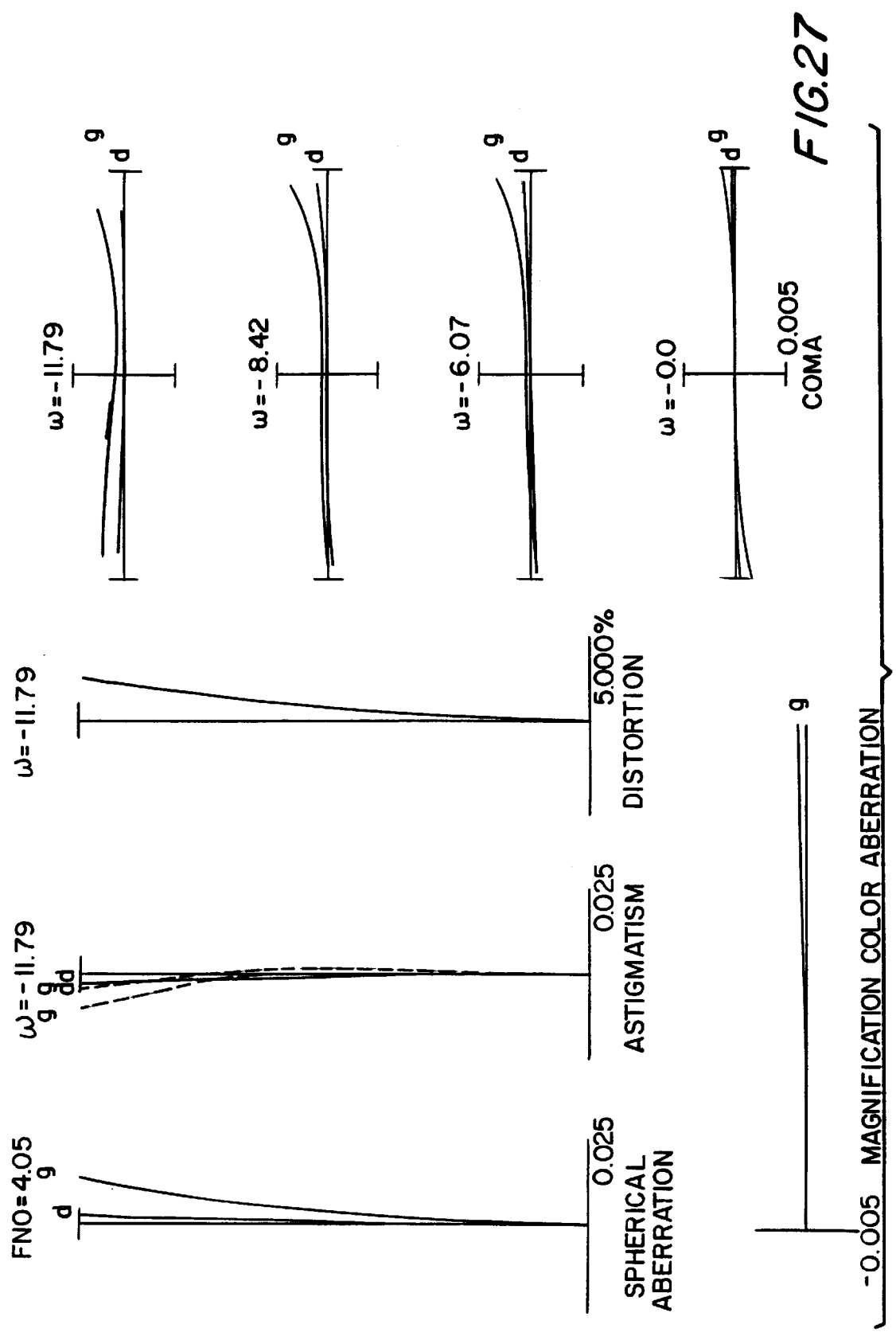
FIG. 27 shows various aberration curves of Embodiment 5 at the maximum telephoto end state.

In each of the aberration curves of FIGS. 25–27; F No is the F number; ω is the field angle; d is the d-line (λ=587.6 nm); g is the g-line (λ=435.8 nm). In an aberration curve showing astigmatism, a solid line shows a sagittal image plane; a dotted line shows a meridional image plane.

As is apparent from each of the aberration curves, this embodiment corrects various aberrations excellently in each of the objective distance states and focal length states, demonstrating an excellent imaging performance.

Embodiment 6

Figure 28:
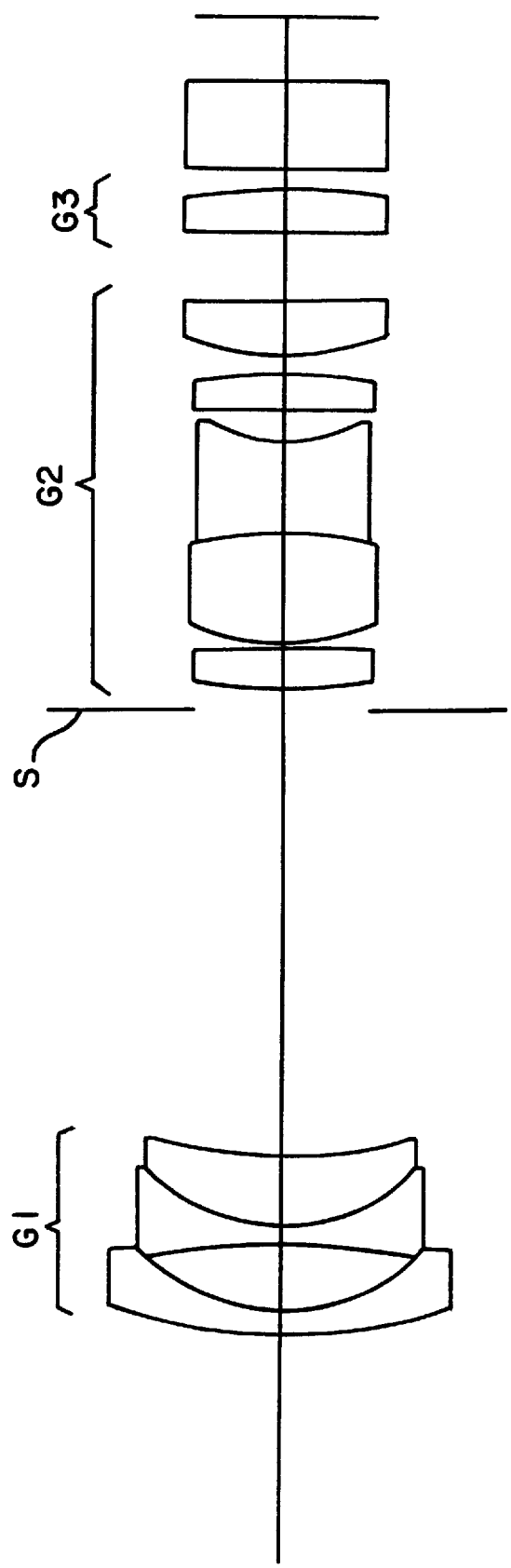
FIG. 28 is a configuration showing a variable magnification optical system of Embodiment 6 of the present invention.

FIG. 28 shows the lay out of the zoom lens system in accordance with Embodiment 6 of the present invention. In the zoom lens system shown in FIG. 28, the first lens group G1 comprises:

a negative meniscus lens having a convex surface facing toward the object side; and a cemented lens, which is made up of a bi-concave lens and a positive meniscus lens having a convex surface facing toward the object side.

The second lens group G2 comprises: in order from the object side, a bi-convex lens, a cemented lens, which is made up of a bi-convex lens and a bi-concave lens;

a positive meniscus lens having a concave surface facing toward the object side; and a positive meniscus lens having a convex surface facing toward the object side.

The third lens group G3 is made up of a bi-convex lens having an aspherical surface facing toward the image side.

The aperture stop S is arranged near the second lens group G2 between the first lens group G1 and the second lens group G2. The aperture stop S moves integral with the second lens group G2 when magnification is changed.

FIG. 28 shows the lens layout of Embodiment 6 at the wide-angle end. When magnification is changed to the maximum telephoto state, the first lens group G1 first moves to the image side and then moves to the object side. The second lens group G2 moves toward the object side. The third lens group G3 is fixed.

In the zoom lens system of Embodiment 6, focusing is performed from the far object to the near object and the first lens group G1 is moved toward the object side.

In Table (6), various values of Embodiment 6 are shown, wherein; f is the focal length; Bf is back focus; F NO is an F number; 2ω is field angle. In the various lens values in Table (6), the first column shows the lens surface number; r in the second column shows the radius of curvature of the lens surface; d in the third column shows the lens surface separation; ν in the fourth column shows Abbe number; n in the fifth column shows the refractive index on the d-line (λ=587.6 nm).

TABLE 6

(Overall Lens Values)
f = 1.000~1.686~2.867
Bf = 0.473
F NO = 2.400~2.878~3.688
2ω = 64.26~38.86~22.66°

(Lens Value)

| Surface NO. | r | d | ν | n | |
|---|---|---|---|---|---|
| 1 | 3.7457 | 0.1855 | 33.27 | 1.80610 | |
| 2 | 1.4670 | 0.4806 | | | |
| 3 | −6.8997 | 0.1686 | 64.20 | 1.51680 | |
| 4 | 1.3998 | 0.5059 | 23.78 | 1.84666 | |
| 5 | 3.3776 | (d5 = variable) | | | |
| 6 | ∞ | 0.1686 | | | Aperture Stop S |
| 7 | 5.4012 | 0.3035 | 33.27 | 1.80610 | |
| 8 | −30.2602 | 0.0169 | | | |

TABLE 6-continued (Overall Lens Values)
f = 1.000~1.686~2.867
Bf = 0.473
F NO = 2.400~2.878~3.688
2ω = 64.26~38.86~22.66°

(Lens Value)

| Surface NO. | r | d | ν | n |
|---|---|---|---|---|
| 9 | 1.5945 | 0.8432 | 47.19 | 1.67003 |
| 10 | −2.1420 | 0.6661 | 23.78 | 1.84666 |
| 11 | 1.3151 | 0.2024 | | |
| 12 | −288.0907 | 0.2951 | 25.46 | 1.80518 |
| 13 | −5.2404 | 0.1349 | | |
| 14 | 2.0334 | 0.3879 | 42.97 | 1.83500 |
| 15 | 10.7212 | (d15 = variable) | | |
| 16 | 18.7674 | 0.3204 | 55.18 | 1.66547 |
| 17* | −3.7127 | 0.1686 | | |
| 18 | ∞ | 0.6239 | 64.10 | 1.51680 |
| 19 | ∞ | (Bf) | | |

(Aspherical Surface Data)

| | r | K | C4 |
|---|---|---|---|
| 17th Surface | −3.7127 | 1.00000 | +6.23627 × 10⁻² |
| | C6 | C8 | C10 |
| | −2.09000 × 10⁻² | +7.19490 × 10⁻² | −7.19555 × 10⁻² |

(Variable Lens Separation Values during Zooming in Motion)

| | Wide-angle End | Med. Focal Length | Telephoto End |
|---|---|---|---|
| f | 1.00000 | 1.68634 | 2.86677 |
| d5 | 3.34451 | 1.57013 | 0.50560 |
| d13 | 0.50590 | 1.45846 | 3.09677 |
| Bf | 0.472 | 0.473 | 0.473 |

(Values Corresponding to the Condition)
(6) f2/|f1|=1.067
(7) f3/fw=4.684
(8) ν1=33.27
(9) n3−n2=0.32986
(10) (rR+rF)/(rR−rF)=1.47
(11) fP/f2=1.20
(12) hR/fw=0.44
(13) f2/fw=2.46
(14) f3/f2=1.90

Figure 29:
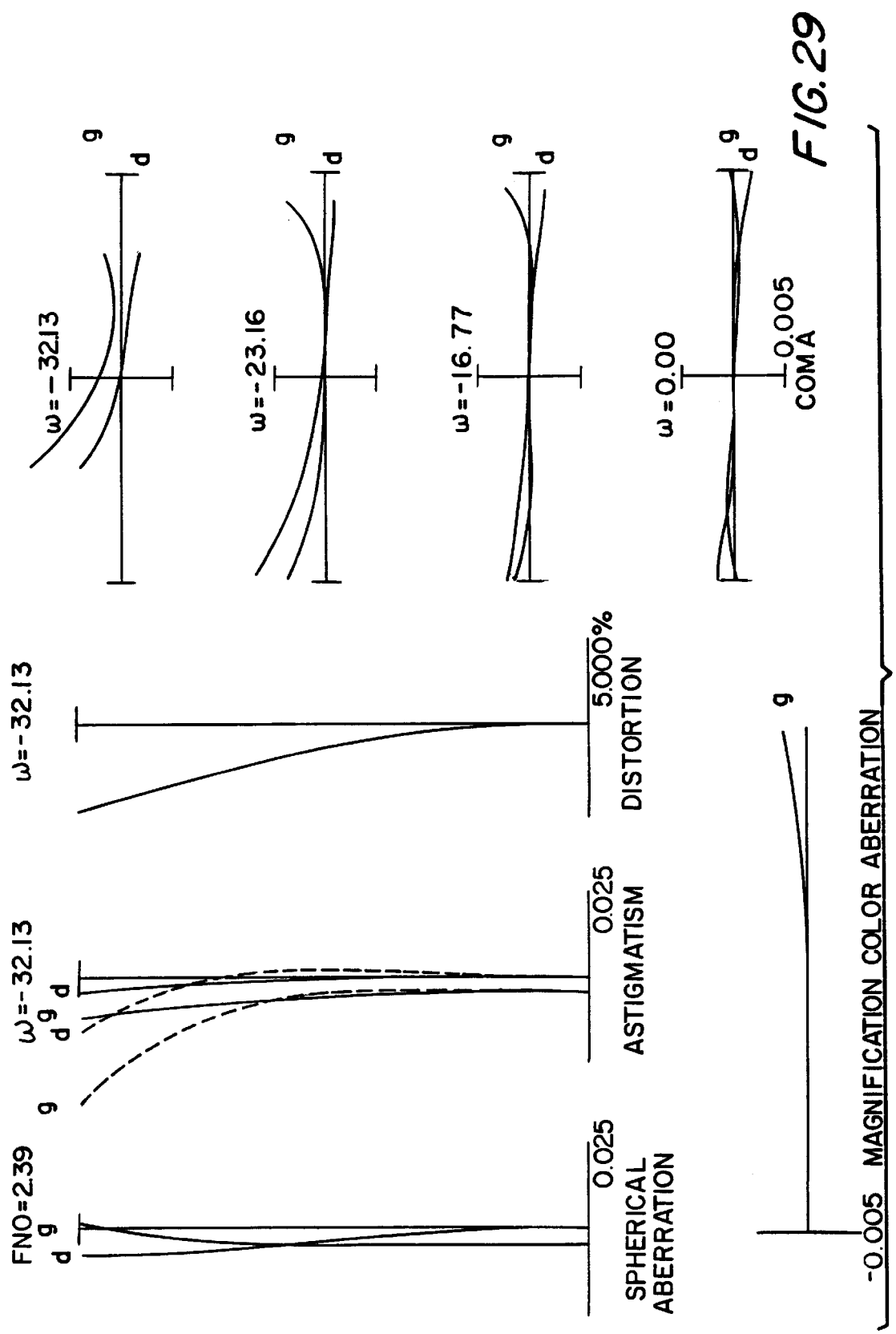
FIG. 29 shows various aberration curves of Embodiment 6 at the maximum wide-angle end state.
Figure 30:
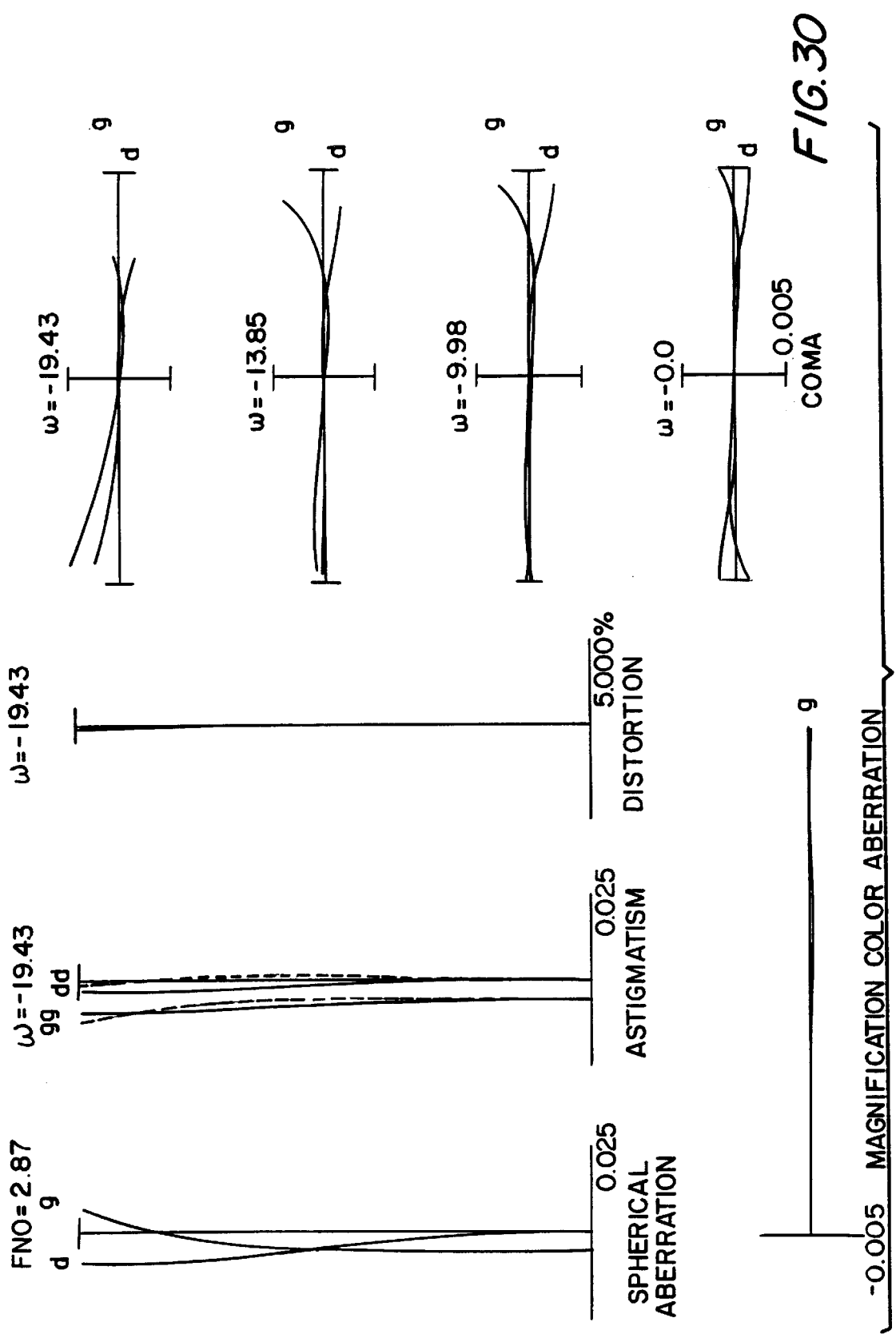
FIG. 30 shows various aberration curves of Embodiment 6 at the mid focal length state.
Figure 31:
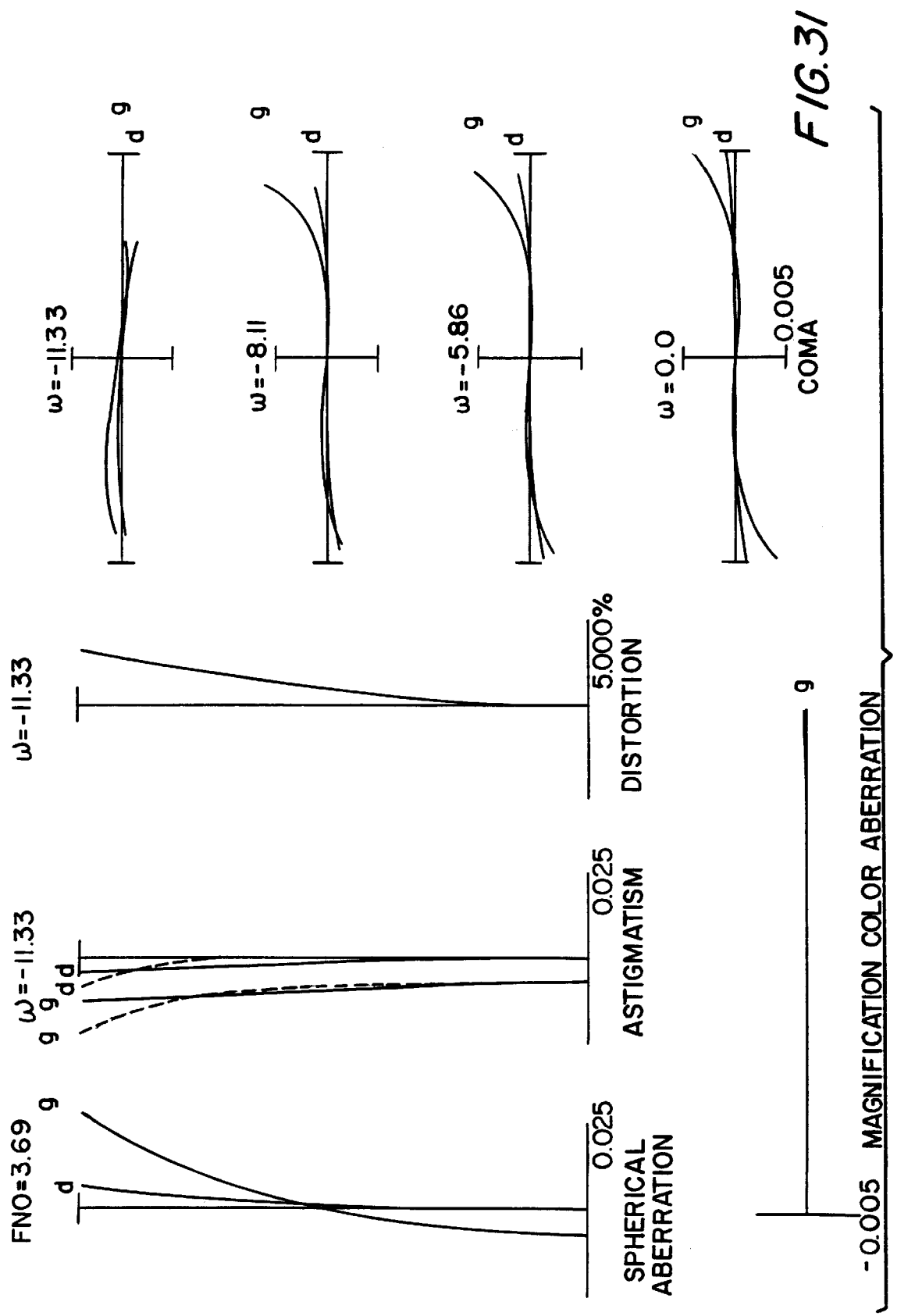
FIG. 31 shows various aberration curves of Embodiment 6 at the maximum telephoto end state.

FIGS. 29 shows various aberration curves of Embodiment 6 in the maximum wide-angle state. FIG. 30 shows various aberration curves in the mid focal length state. FIG. 31 shows various aberration curves in the maximum telephoto state.

In each of the aberration curves of FIGS. 29–31; F No is the F number; ω is the field angle; d is the d-line (λ=587.6 nm); g is the g-line (λ=435.8 nm). In an aberration curve showing astigmatism, a solid line shows a sagittal image plane; a dotted line shows a meridional image plane.

As is apparent from each of the aberration curves, this embodiment corrects various aberrations excellently in each of the objective distance states and focal length states, demonstrating an excellent imaging performance.

Embodiment 7

Figure 32:
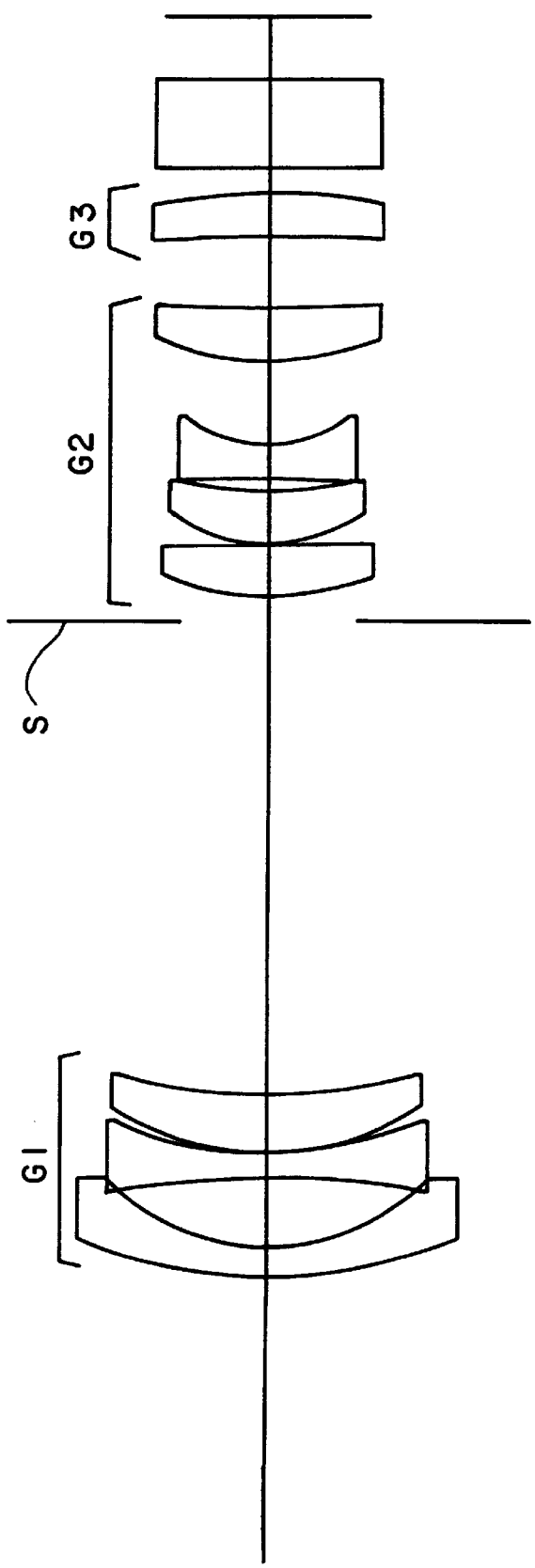
FIG. 32 is a configuration showing a variable magnification optical system for Embodiment 7 of the present invention.

FIG. 32 shows the lay out of the zoom lens system of Embodiment 7 of the present invention. In the zoom lens system as shown in FIG. 32, the first lens group G1 comprises:

- a negative meniscus lens having a convex surface facing toward the object side;
- a bi-concave lens and
- a positive meniscus lens having a convex surface facing toward the object side.

The second lens group G2 comprises: in order from the object side,

- a positive meniscus lens having a convex surface facing toward the object side;
- a positive meniscus lens having a convex surface facing toward the object side;
- a bi-concave lens; and
- a positive meniscus lens having a convex aspherical surface facing toward the object side.

The third lens group G3 is made up of a positive meniscus lens having a convex aspherical surface facing toward the image side.

The aperture stop S is arranged near the second lens group G2 between the first lens group G1 and the second lens group G2. The aperture stop S moves integrally with the second lens group G2 when the magnification is changed.

FIG. 32 shows a lens layout at the wide-angle end. When magnification is changed to the maximum telephoto state, the first lens group G1 first moves to the image side, then moves to the object side. The second lens group G2 moves toward the object side. The third lens group G3 is fixed.

In the zoom lens system of Embodiment 7, when focusing is performed from the far object to the near object, the first lens group G1 is moved toward the object side.

In Table (7), various values of Embodiment 7 are shown, wherein; f is the focal length; Bf is back focus; F NO is an F number; $2\omega$ is field angle. In the various lens values in Table (7), the first column shows the lens surface number; r in the second column shows the radius of curvature of the lens surface; d in the third column shows the lens surface separation; $\nu$ in the fourth column shows Abbe number; n in the fifth column shows the refractive index on the d-line ($\lambda$=587.6 nm).

TABLE 7

(Overall Lens Values)
f = 1.000~1.714~3.000
Bf = 0.385
F NO = 2.202~2.692~3.567
$2\omega$ = 62.33~36.92~20.90°

| (Lens Value) Surface NO. | r | d | $\nu$ | n | |
|---|---|---|---|---|---|
| 1 | 3.1167 | 0.1857 | 39.82 | 1.86994 | |
| 2 | 1.3558 | 0.4262 | | | |
| 3 | −7.0527 | 0.1571 | 70.41 | 1.48749 | |
| 4 | 2.1850 | 0.0071 | | | |
| 5 | 1.7180 | 0.3680 | 23.01 | 1.86074 | |
| 6 | 3.2356 | (d6) | | | |
| 7 | ∞ | 0.1428 | | | Aperture Stop S |
| 8 | 1.5457 | 0.3405 | 39.82 | 1.86994 | |
| 9 | 23.9136 | 0.0071 | | | |
| 10 | 1.0356 | 0.3416 | 82.52 | 1.49782 | |
| 11 | 2.6302 | 0.0607 | | | |
| 12 | −49.2184 | 0.2256 | 23.01 | 1.86074 | |
| 13 | 0.8474 | 0.4891 | | | |
| 14* | 1.5428 | 0.3456 | 45.37 | 1.79668 | |

TABLE 7-continued (Overall Lens Values)
f = 1.000~1.714~3.000
Bf = 0.385
F NO = 2.202~2.692~3.567
$2\omega$ = 62.33~36.92~20.90°

| (Lens Value) Surface NO. | r | d | $\nu$ | n |
|---|---|---|---|---|
| 15 | 24.5336 | (d15) | | |
| 16 | −22.6776 | 0.2820 | 45.37 | 1.66547 |
| 17* | −2.9258 | 0.1428 | | |
| 18 | ∞ | 0.5471 | 64.10 | 1.51680 |
| 19 | ∞ | | | |

Aspherical Surface Data
(14th Surface)

| | |
|---|---|
| K = | 1.00000 |
| C4 = | −4.75934 · 10$^{-2}$ |
| C6 = | −6.66061 · 10$^{-3}$ |
| C8 = | 2.95222 · 10$^{-2}$ |
| C10 = | 0.00000 |

(17th Surface)

| | |
|---|---|
| K = | 1.00000 |
| C4 = | 7.54543 · 10$^{-2}$ |
| C6 = | −3.68093 · 10$^{-2}$ |
| C8 = | 5.46038 · 10$^{-2}$ |

Zooming Data

| | Wide angle End | Med. Focal Length | Telephoto End |
|---|---|---|---|
| f | 2.97679 | 1.29485 | 0.28568 |
| d5 | 0.42852 | 1.20648 | 2.60679 |
| d13 | 0.38473 | 0.38476 | 0.38485 |

Values Corresponding to the Condition
(10)(rR+rF)/(rR−rF) 1.13
(11)fP/f2 0.98
(12)hR/fw 0.38
(13)f2/fw 2.10
(14)f3/f2 2.00

Figure 33:
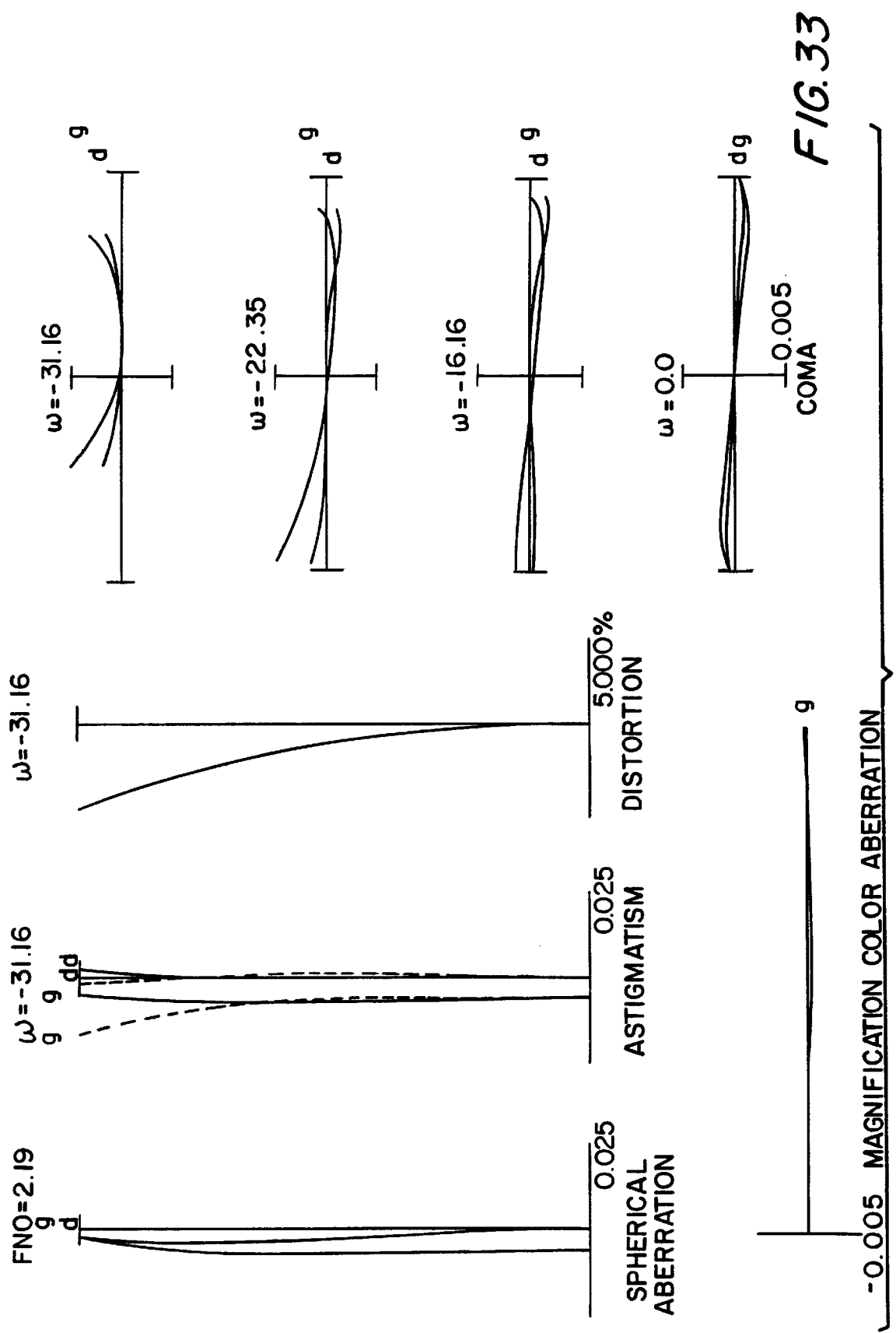
FIG. 33 shows various aberration curves of Embodiment 7 at the maximum wide-angle end state.
Figure 34:
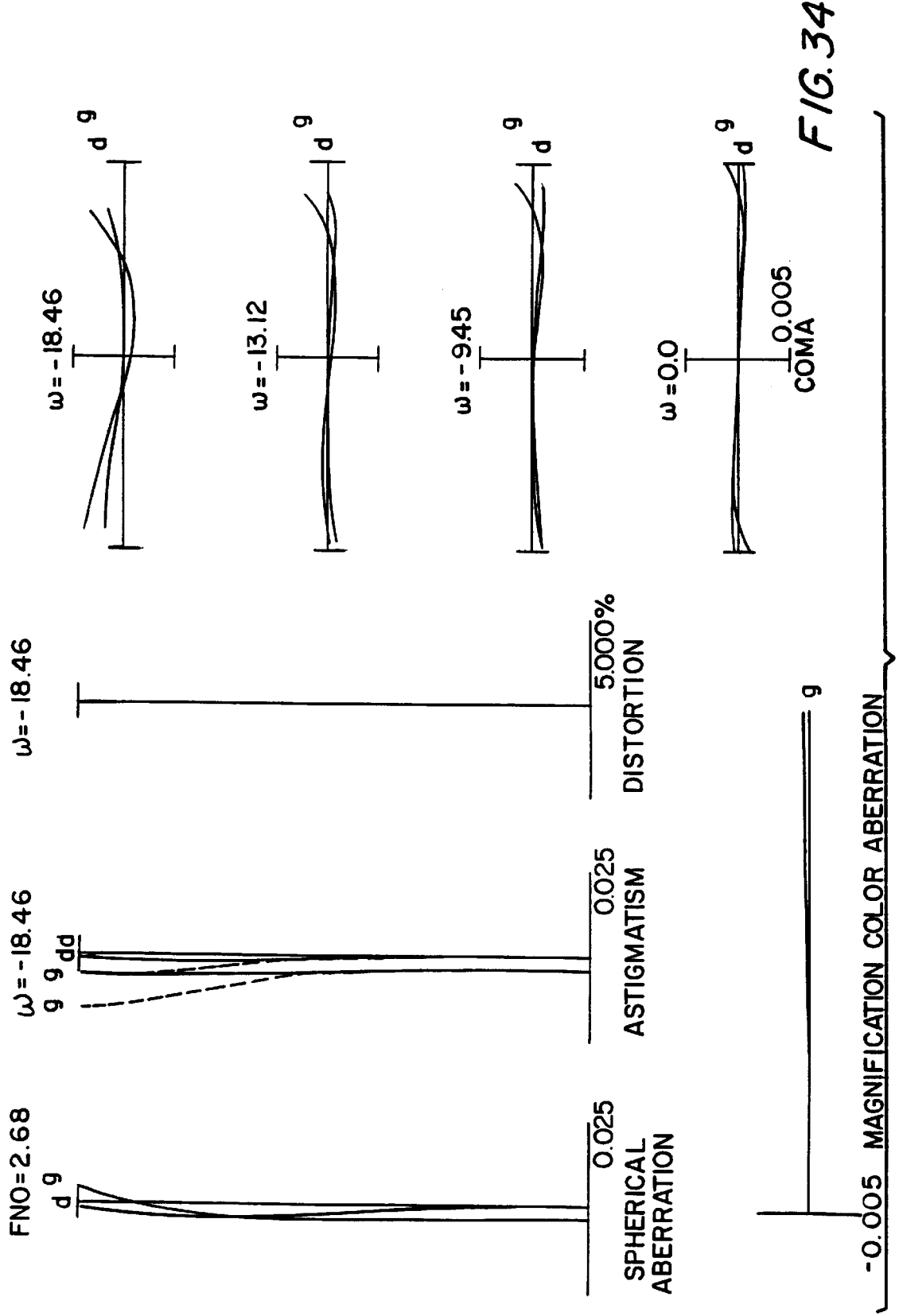
FIG. 34 shows various aberration curves of Embodiment 7 at the mid focal length state.
Figure 35:
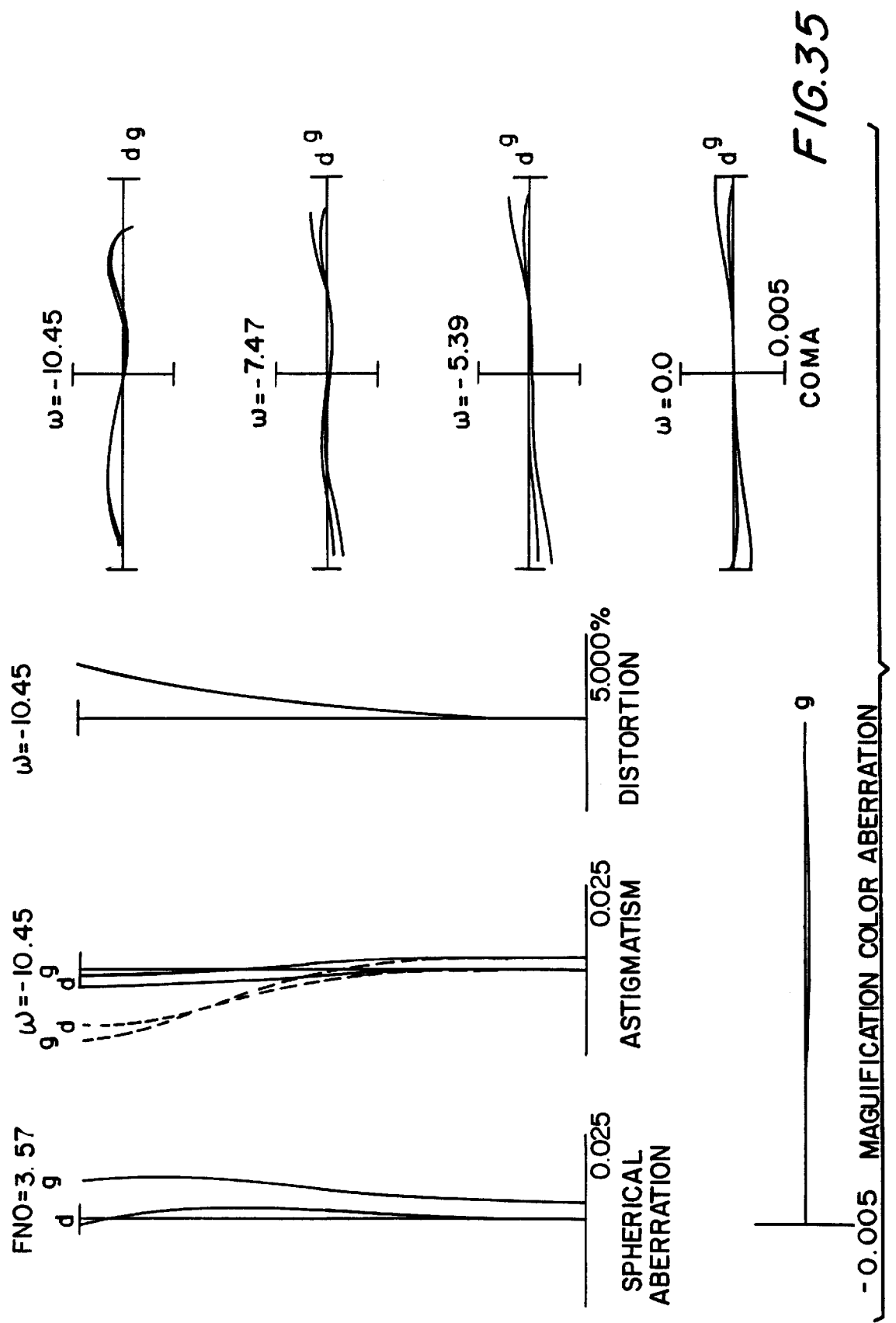
FIG. 35 shows various aberration curves of Embodiment 7 at the maximum telephoto end state.
Figure 36:
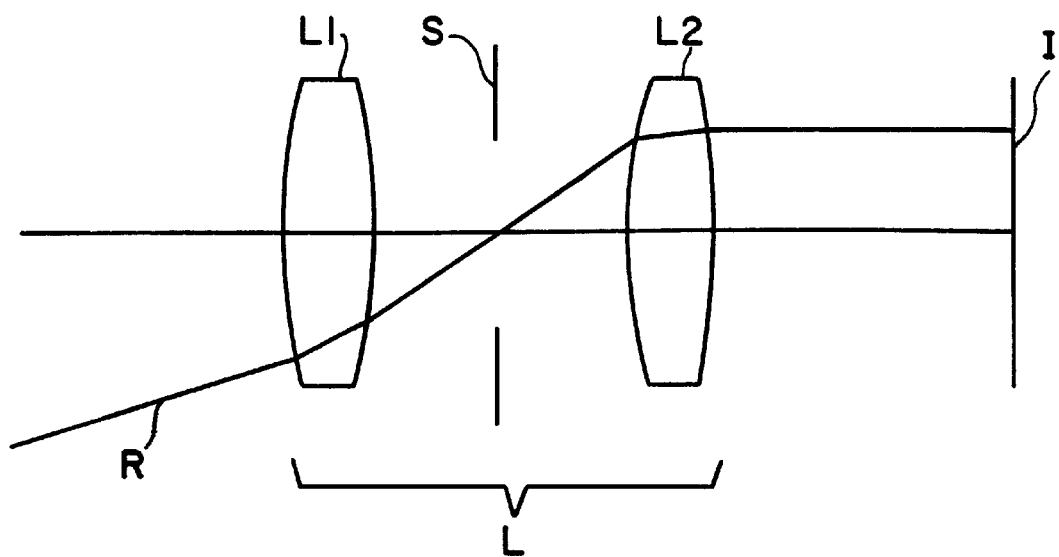
FIG. 36 is a diagram showing the refractive power layout in the image side telocentric optical system with the exit pupil in the infinitely far state.

FIG. 33 shows various aberration curves in Embodiment 7 in the maximum wide-angle state. FIG. 34 shows various aberration curves in the mid focal length state. FIG. 35 shows various aberration curves in the maximum telephoto state.

In each of the aberration curves, F No is the F number; $\omega$ is the field angle; d is the d-line ($\lambda$=587.6 nm); g is the g-line ($\lambda$=435.8 nm). In an aberration curve showing astigmatism, a solid line shows a sagittal image plane; a dotted line shows a meridional image plane.

As is apparent from each of the aberration curves, this embodiment corrects various aberrations excellently in each of the objective distance states and focal length states, demonstrating an excellent imaging performance.

Embodiments 3 through 7 can provide a compact zoom lens system which is suitable for a video camera or digital still camera and the like using a solid image sensor and the like, with a magnification of 2.5 or higher, a field angle of about 60°, an excellent imaging performance, which is capable of adopting a solid image sensor having numerous pixels.

The above embodiments intend to show the content of the technology of the present invention. These embodiments do not limit the interpretation of the present invention. They can be modified in various ways as long as the spirit of the present invention is maintained.

What is claimed is:

1. A variable magnification zoom lens system having an optical axis comprising, in order from an object side, a first lens group consisting of two negative lenses and a positive lens and having an overall negative refractive power;

a second lens group having a positive refractive power; and a third lens group, which is fixed along the optical axis and overall has a positive refractive power;

with the first and second lens group arranged to be driven such that when zooming from a maximum wide-angle state to a maximum telephoto state, the distance between said first lens group and said second lens group is reduced, and at the same time, the distance between said second lens group and said third lens group is increased; and the following conditions are fulfilled:

$$0.7 < f2/|f1| < 1.5$$

$$3 < f3/fw < 10$$

wherein:
f1 is: the focal length of said first lens group;
f2 is: the focal length of said second lens group;
f3 is: the focal length of said third lens group; and
fW is: an overall focal length of said zoom lens system in the maximum wide-angle state wherein said first lens group consists of, in order from the object side, a negative meniscus lens having a convex surface facing toward the object side; and a cemented lens made up of a bi-concave negative lens and a positive meniscus lens with said positive meniscus lens having a convex surface facing toward the object side.

2. The zoom lens system of claim 1 wherein the following conditions are fulfilled:

$$30 < v1 < 40 \text{ and}$$

$$0.25 < n3 - n2$$

wherein;
v1 is: Abbe number of said negative meniscus lens;
n2 is: the refractive index on the d-line of said bi-concave lens;
n3 is: the refractive index on the d-line of said positive meniscus lens.

3. The zoom lens system of claim 1 wherein said second lens group comprises: in order from the object side,
two positive lenses;
one negative lens, and
one positive lens.

4. The zoom lens system of claim 2 wherein said second lens group comprises: in order from the object side:
two positive lenses;
one negative lens; and
one positive lens.

5. The zoom lens system of claim 1 wherein said second lens group comprises: in order from the object side,
two positive lenses;
one negative lens; and
two positive lenses.

6. The zoom lens system of claim 2 wherein said second lens group comprises: in order from the object side,
two positive lenses;
one negative lens; and
two positive lenses.

7. The zoom lens system of claim 1 wherein said third lens group comprises one positive single lens having at least one aspherical surface.

8. The zoom lens system of claim 7 wherein said positive single lens is bi-convex; and an image side surface of said positive single lens is aspherical such that the positive refractive power is reduced from the optical axis toward the periphery.

9. A variable magnification zoom lens system having an optical axis comprising, in order from an object side, a first lens group consisting of two negative lenses and a positive lens and having an overall negative refractive power;

a second lens group having a positive refractive power; and a third lens group, which is fixed along the optical axis and overall has a positive refractive power;

with the first and second lens group arranged to be driven such that when zooming from a maximum wide-angle state to a maximum telephoto state, the distance between said first lens group and second lens group is reduced, and at the same time, the distance between said second lens group and said third lens group is increased; and the following conditions are fulfilled:

$$0.7 < f2/|f1| < 1.5$$

$$3 < f3/fw < 10$$

wherein:
f1 is: the focal length of said first lens group;
f2 is: the focal length of said second lens group;
f3 is: the focal length of said third lens group; and
fW is: an overall focal length of said zoom lens system in the maximum wide-angle state and wherein said third lens group comprises one positive single lens having at least one aspherical surface wherein said positive single lens is bi-convex; and an image side surface of said positive single lens is aspherical such that said positive refractive power is reduced from the optical axis toward the periphery.

* * * * *